US012615184B2

(12) United States Patent
Azzam et al.

(10) Patent No.: US 12,615,184 B2
(45) Date of Patent: Apr. 28, 2026

(54) SYSTEMS FOR UPDATING PERIPHERAL DEVICE SETTINGS

(71) Applicant: Geotab Inc., Oakville (CA)

(72) Inventors: Shady Azzam, Stittsville (CA); Bruno Simione Beltrame, Milton (CA); Sebastian Brian Hoefert, Burlington (CA); Sanjeev Manickam, Kanata (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 19/264,942

(22) Filed: Jul. 10, 2025

(65) Prior Publication Data

US 2026/0019329 A1     Jan. 15, 2026

Related U.S. Application Data

(60) Provisional application No. 63/671,426, filed on Jul. 15, 2024.

(51) Int. Cl.
*H04L 41/082* (2022.01)
(52) U.S. Cl.
CPC .................................. *H04L 41/082* (2013.01)
(58) Field of Classification Search
None
See application file for complete search history.

(56) References Cited

U.S. PATENT DOCUMENTS

| | | | | |
|---|---|---|---|---|
| 12,094,261 B2 * | 9/2024 | Gulati | ...................... | H04L 69/28 |
| 12,106,671 B1 * | 10/2024 | Basra | ................... | G06F 11/3089 |

| | | | |
|---|---|---|---|
| 2010/0306319 A1 | 12/2010 | Brzozowski | |
| 2015/0007155 A1 | 1/2015 | Hoffman et al. | |
| 2015/0032291 A1 | 1/2015 | Lowrey et al. | |
| 2015/0286475 A1 | 10/2015 | Vangelov et al. | |
| 2019/0007484 A1 * | 1/2019 | Chen | ....................... H04W 4/40 |
| 2020/0043250 A1 | 2/2020 | Maier et al. | |
| 2023/0267776 A1 | 8/2023 | Yano | |

FOREIGN PATENT DOCUMENTS

| | | |
|---|---|---|
| CN | 116339768 A | 6/2023 |
| EP | 3584703 A1 | 12/2019 |
| WO | 2014143761 A2 | 9/2014 |

OTHER PUBLICATIONS

Abdelrahman et al., "ThingsDriver: A Unified Interoperable Driver for IoT Nodes", May 30, 2022, IEEE, 2022 International Wireless Communications and Mobile Computing (IWCMC) (2022, pp. 877-882) (Year: 2022).*
International Search Report and Written Opinion for International Application No. PCT/CA2025/050955, mailed Oct. 16, 2025, 12 pages.
Extended European Search Report for European Application No. 25188215.5, mailed Dec. 11, 2025, 11 pages.

* cited by examiner

*Primary Examiner* — Davoud A Zand
(74) *Attorney, Agent, or Firm* — Mark J. Pringle-Rigby

(57) ABSTRACT

Multiple communication modules are used in updating settings at a peripheral device. A management server communicates settings updates for the peripheral device indirectly via a telematics device installed at a vehicle. Setting update messages are split into message segments. Access point settings for communication with a communication network by the peripheral device can be updated indirectly via the telematics device. Further setting changes received while a setting update is being applied can be saved as pending update session for subsequent communication.

20 Claims, 12 Drawing Sheets

| Setting Name | Setting ID | Value |
|---|---|---|
| Speaker Volume | 1 | 7 |
| Capture Frequency | 2 | 15 FPS |
| Capture Resolution | 3 | 1280x720 |
| Access Point ID | 4 | X |
| Device Height | 5 | 1.5 m |
| Device Distance from Center | 6 | -0.2m |

| Setting | Setting ID | Value |
|---|---|---|
| Speaker Volume | 1 | Null |
| Capture Frequency | 2 | 15 FPS |
| Capture Resolution | 3 | 1280x720 |
| Access Point ID | 4 | Null |
| Device Height | 5 | Null |
| Device Distance from Center | 6 | Null |

| Setting | Setting ID | Value |
|---|---|---|
| Speaker Volume | 1 | 7 |

Message segment 1

| Setting | Setting ID | Value |
|---------|-----------|-------|
| Speaker Volume | 1 | 7 |
| Capture Frequency | 2 | 15 FPS |

Message segment 2

| Setting | Setting ID | Value |
|---------|-----------|-------|
| Capture Resolution | 3 | 1280x720 |
| Access Point ID | 4 | X |

Message segment 3

| Setting | Setting ID | Value |
|---------|-----------|-------|
| Device Height | 5 | 1.5 m |
| Device Distance from Center | 6 | -0.2m |

800

Update Session 1

| Setting Name | Setting ID | Value |
|---|---|---|
| Speaker Volume | 1 | 6 |
| Capture Frequency | 2 | 20 FPS |
| Capture Resolution | 3 | 1920x1080 |

Figure 15

Update Session 2

| Setting | Setting ID | Value |
|---|---|---|
| Access Point ID | 4 | Y |

Figure 16

Update Session 3

| Setting | Setting ID | Value |
|---|---|---|
| Capture Frequency | 2 | 30 FPS |
| Capture Resolution | 3 | 2560x1440 |

Figure 17

Pending Update Session (Time 1)

| Setting Name | Setting ID | Value |
|---|---|---|
| Speaker Volume | 1 | 6 |
| Capture Frequency | 2 | 20 FPS |
| Capture Resolution | 3 | 1920x1080 |

Figure 18

Pending Update Session (Time 2)

| Setting Name | Setting ID | Value |
|---|---|---|
| Speaker Volume | 1 | 6 |
| Capture Frequency | 2 | 20 FPS |
| Capture Resolution | 3 | 1920x1080 |
| Access Point ID | 4 | Y |

Figure 19

Pending Update Session (Time 3)

| Setting Name | Setting ID | Value |
|---|---|---|
| Speaker Volume | 1 | 6 |
| Capture Frequency | 2 | 30 FPS |
| Capture Resolution | 3 | 2560x1440 |
| Access Point ID | 4 | Y |

Figure 20

SYSTEMS FOR UPDATING PERIPHERAL DEVICE SETTINGS

PRIOR APPLICATION DATA

This application claims priority to U.S. Provisional Patent Application No. 63/671,426, titled "Systems and Methods for Updating Peripheral Device Settings", filed on Jul. 15, 2024, the entirety of which is incorporated by reference herein.

TECHNICAL FIELD

The present disclosure generally relates to systems, devices, and methods for updating device settings, and in particular relates to updating settings at peripheral devices.

BACKGROUND

Peripheral devices can be controlled or operated at least partially based on user-configurable settings. It is desirable to be able to update such settings as needed to optimize performance of such peripheral devices. Further, it is desirable to be able to perform these updates using existing connections or communication hardware at the peripheral devices, such that a change in connection to peripheral devices does not need to be established for the purposes of updating settings.

SUMMARY

According a broad aspect, the present disclosure describes a method performed between a management server having a first communication module, a telematics device having a second communication module and a third communication module, and a peripheral device having a fourth communication module, the method comprising: receiving, by the management server, a user input indicative of a setting update for the peripheral device; transmitting, by the first communication module of the management server to the third communication module of the telematics device, a setting update message which specifies at least one setting to apply at the peripheral device based on the user input indicative of a setting update; transmitting, by the second communication module of the telematics device to the fourth communication module of the peripheral device, the setting update message; and applying, by at least one processor of the peripheral device, the at least one setting specified in the setting update message.

The setting update message may include a plurality of sequential message segments; and transmitting the setting update message by the first communication module to the third communication module may comprise transmitting each message segment of the plurality of message segments in sequence. Transmitting the setting update message by the second communication module to the fourth communication module may comprise transmitting each message segment of the plurality of message segments in sequence.

The method may further comprise bundling, by at least one processor of the telematics device, at least a subset of the plurality of message segments as at least one bundled set of message segments, and transmitting the setting update message, by the second communication module of the telematics device to the fourth communication module of the peripheral device, may comprises: transmitting the at least one bundled set of message segments. Bundling at least a subset of the plurality of message segments as at least one bundled set of message segments may comprise bundling all of the plurality of message segments as a single bundled set of message segments. Bundling at least a subset of the plurality of message segments as at least one bundled set of message segments may comprise bundling respective subsets of the plurality of message segments as a plurality of bundled sets of message segments.

Transmitting each message segment of the plurality of message segments in sequence may comprise, for each message segment: transmitting the message segment by the first communication module to the third communication module; and in response to receiving the message segment by the third communication module, transmitting an acknowledgement by the third communication module to the first communication module; and in response to improper reception of a message segment by the third communication module, the method may comprise transmitting a subset of the plurality of message segments in sequence, starting from a sequentially first message segment for which an acknowledgement was not received by the first communication module.

The method may further comprise: while transmitting the setting update message, receiving, by the management server, a further user input indicative of a further setting update for the peripheral device; and updating the setting update message to include at least one further message segment which specifies at least one setting to apply at the peripheral device based on the further user input indicative of the further setting update. Transmitting each message segment of the plurality of message segments in sequence may comprise, for each message segment: after updating the setting update message: transmitting the further message segment after the first communication module receives an acknowledgement from the third communication module of a particular message segment which includes changes to at least one particular setting updated in the further setting update. Transmitting each message segment of the plurality of message segments in sequence may comprise: transmitting the further message segment after the first communication module receives an acknowledgement from the third communication module of each message segment initially included in the plurality of message segments in the setting update message. Updating the setting update message to include the at least one further message segment which includes instructions to apply the further setting update at the peripheral device may comprise: inserting the at least one further message segment into the setting update message immediately sequential to a particular message segment which includes changes to the at least one setting updated in the further setting update. Updating the setting update message to include the at least one further message segment which includes instructions to apply the further setting update at the peripheral device may comprise: inserting the at least one further message segment into the setting update message sequentially after all message segments initially in the plurality of message segments.

The method may further comprise: while transmitting the setting update message, receiving, by the management server, a further user input indicative of a further setting update for the peripheral device; transmitting, by the first communication module of the management server to the third communication module of the telematics device, a further setting update message which specifies at least one setting to apply at the peripheral device based on the further user input indicative of the further setting update; transmitting, by the second communication module of the telematics device to the fourth communication module of the peripheral device, the further setting update message; and applying, by at least one processor of the peripheral device, the at least one further setting specified in the further setting update message.

The method may further comprise: encrypting, by the management server prior to transmitting the setting update message to the telematics device, the setting update message; and decrypting, by the peripheral device, the setting update message.

The peripheral device may comprise a fifth communication module; the setting update message may specify at least one setting for the peripheral device to communicate via the fifth communication module with a communication access point; and applying, by at least one processor of the peripheral device, the at least one setting specified in the setting update message may comprise opening communication via the fifth communication module with the communication access point.

The peripheral device may comprise a fifth communication module, wherein the fifth communication module communicates with a first communication access point; the setting update message may specify at least one setting for the peripheral device to communicate via the fifth communication module with a second communication access point different from the first communication access point; and applying, by at least one processor of the peripheral device, the at least one setting specified in the setting update message may comprise opening communication via the fifth communication module with the second communication access point and terminating communication via the fifth communication module with the first communication access point.

Receiving, by the management server, a user input indicative of a setting update for the peripheral device may comprise: receiving the user input via a user interface communicatively coupled to the management server and remote from the telematics device and the peripheral device.

Receiving, by the management server, a user input indicative of a setting update for the peripheral device may comprise: receiving the user input via a user interface communicatively coupled to the management server and proximate the telematics device and the peripheral device.

The method may further comprise: storing, by at least one non-transitory processor-readable storage medium of the management server, a first update session, the first update session specifying the at least one setting to apply at the peripheral device based on the user input indicative of the setting update; and preparing the setting update message by at least one processor of the management server by accessing the first update session and generating the setting update message to specify the at least one setting specified in the first update session. The method may further comprise: before completion of applying the at least one setting specified in the setting update message: receiving a further user input indicative of a further setting update for the peripheral device; and storing, by the at least one non-transitory processor-readable storage medium of the management server, a second update session, the second update session specifying the at least one further setting to apply at the peripheral device based on the further user input indicative of the further setting update; and after completion of applying the at least one setting specified in the setting update message: preparing a second setting update message by the at least one processor of the management server by accessing the second update session and generating the second setting update message to specify the at least one setting to be updated at the peripheral device as specified in the second update session; transmitting, by the first communication module of the management server to the third communication module of the telematics device, the second setting update message; transmitting, by the second communication module of the telematics device to the fourth communication module of the peripheral device, the second setting update message; and applying, by the at least one processor of the peripheral device, the at least one setting specified in the second setting update message. The method may further comprise: before completion of applying the at least one setting specified in the setting update message: receiving at least one further user input indicative of at least one further setting update for the peripheral device; and storing, by the at least one non-transitory processor-readable storage medium of the management server, at least one further update session, each further update session specifying a respective setting update of the at least one further setting update date to apply at the peripheral device based on the at least one further user input indicative of the at least one further setting update; and after completion of applying the at least one setting specified in the setting update message, sequentially for each further update session of the at least one further update session: preparing an additional setting update message by the at least one processor of the management server by accessing the further update session and generating the additional setting update message to specify the at least one setting to be updated at the peripheral device as specified in the further update session; transmitting, by the first communication module of the management server to the third communication module of the telematics device, the further setting update message; transmitting, by the second communication module of the telematics device to the fourth communication module of the peripheral device, the further setting update message; and applying, by the at least one processor of the peripheral device, the at least one setting specified in the further setting update message.

According to another broad aspect, the present disclosure describes a system comprising: a management server having a first communication module, a first at least one processor, and a first at least one non-transitory processor readable storage medium storing first processor-executable instructions thereon; a telematics device having a second communication module, a third communication module, a second at least one processor, and a second at least one non-transitory processor readable storage medium storing second processor-executable instructions thereon; and a peripheral device having a fourth communication module, a third at least one processor, and a third at least one non-transitory processor readable storage medium storing third processor-executable instructions thereon, wherein: the first processor-executable instructions cause the management server to: receive, by the management server, a user input indicative of a setting update for the peripheral device; and transmit, by the first communication module, a setting update message which specifies at least one setting to apply at the peripheral device based on the user input indicative of a setting update; the second processor-executable instructions cause the telematics device to: receive, by the third communication module, the setting update message from the management server; and transmit, by the second communication module, the setting update message; and the third processor-executable instructions cause the peripheral device to: receive, by the fourth communication module, the setting update message from the telematics device; and apply, by at least one processor of the peripheral device, the at least one setting specified in the setting update message.

The setting update message may include a plurality of sequential message segments; and the first processor-executable instructions which cause the management server to transmit the setting update message cause the first communication module to transmit each message segment of the plurality of message segments in sequence.

The second processor-executable instructions which cause the telematics device to transmit the setting update message may cause the second communication module to transmit each message segment of the plurality of message segments in sequence.

The second processor-executable instructions may further cause the telematics device to bundle, by the second at least one processor, at least a subset of the plurality of message segments as at least one bundled set of message segments, the second processor-executable instructions which cause the telematics device to transmit the setting update message may cause the second communication module to transmit the at least one bundled set of message segments. The second processor-executable instructions which cause the telematics device to bundle at least a subset of the plurality of message segments as at least one bundled set of message segments may cause the second at least one processor to bundle all of the plurality of message segments as a single bundled set of message segments. The second processor-executable instructions which cause the telematics device to bundle at least a subset of the plurality of message segments as at least one bundled set of message segments may cause the second at least one processor to bundle respective subsets of the plurality of message segments as a plurality of bundled sets of message segments.

The first processor-executable instructions which cause the first communication module to transmit each message segment of the plurality of message segments in sequence may cause the first communication module to, for each message segment: transmit the message segment; and receive an acknowledgement of the message segment by the third communication module; and in response to improper reception of a message segment by the third communication module, the first processor-executable instructions may cause the management server to transmit a subset of the plurality of message segments in sequence, starting from a sequentially first message segment for which an acknowledgement was not received by the first communication module.

In response to receiving, by the management server, a further user input indicative of a further setting update for the peripheral device while transmitting the setting update message: the first processor-executable instructions may cause the management server to update the setting update message to include at least one further message segment which specifies at least one setting to apply at the peripheral device based on the further user input indicative of the further setting update. The first processor-executable instructions which cause the first communication module to transmit each message segment of the plurality of message segments in sequence may cause the first communication interface to, for each message segment: after the setting update message is updated: transmit the further message segment after the first communication module receives an acknowledgement from the third communication module of a particular message segment which includes changes to at least one particular setting updated in the further setting update. The first processor-executable instructions which cause the first communication module to transmit each message segment of the plurality of message segments in sequence may cause the first communication interface to:

transmit the further message segment after the first communication module receives an acknowledgement from the third communication module of each message segment initially included in the plurality of message segments in the setting update message. The first processor-executable instructions which cause the management server to update the setting update message to include the at least one further message segment which includes instructions to apply the further setting update at the peripheral device may cause the management server to: insert the at least one further message segment into the setting update message immediately sequential to a particular message segment which includes changes to the at least one setting updated in the further setting update. The first processor-executable instructions which cause the management server to update the setting update message to include the at least one further message segment which includes instructions to apply the further setting update at the peripheral device may cause the management server to: insert the at least one further message segment into the setting update message sequentially after all message segments initially in the plurality of message segments.

In response to receiving, by the management server while transmitting the setting update message, a further user input indicative of a further setting update for the peripheral device: the first processor-executable instructions may further cause the management server to: transmit, by the first communication module, a further setting update message which specifies at least one setting to apply at the peripheral device based on the further user input indicative of the further setting update; the second processor-executable instructions may further cause the telematics device to: receive, by the third communication module, the further setting update message from the management server; and transmit, by the second communication module, the further setting update message; and the third processor-executable instructions may further cause the peripheral device to: receive, by the fourth communication module of the peripheral device, the further setting update message from the telematics device; and apply, by the at least one processor of the peripheral device, the at least one further setting specified in the further setting update message.

The first processor-executable instructions may further cause the management server to, prior to transmitting the setting update message to the telematics device, encrypt the setting update message; and the third processor-executable instructions may cause the peripheral device to decrypt the setting update message.

The peripheral device may comprise a fifth communication module; the setting update message may specify at least one setting for the peripheral device to communicate via the fifth communication module with a communication access point; and the third processor-executable instructions which cause the peripheral device to apply the at least one setting specified in the setting update message may cause the peripheral device to open communication via the fifth communication module with the communication access point.

The peripheral device may comprise a fifth communication module, wherein the fifth communication module communicates with a first communication access point; the setting update message may specify at least one setting for the peripheral device to communicate via the fifth communication module with a second communication access point different from the first communication access point; and the third processor-executable instructions which cause the peripheral device to apply the at least one setting specified in the setting update message may cause the peripheral device to open communication via the fifth communication module with the second communication access point and terminate communication via the fifth communication module with the first communication access point.

The user input indicative of a setting update for the peripheral device may comprise a user input via a user interface communicatively coupled to the management server and remote from the telematics device and the peripheral device.

The user input indicative of a setting update for the peripheral device may comprise a user input via a user interface communicatively coupled to the management server and proximate the telematics device and the peripheral device.

The first processor-executable instructions may further cause the management server to: store, by the first at least one non-transitory processor-readable storage medium, a first update session, the first update session specifying the at least one setting to apply at the peripheral device based on the user input indicative of the setting update; and prepare the setting update message by at least one processor of the management server by accessing the first update session and generating the setting update message to specify the at least one setting specified in the first update session. In response to receiving a further user input indicative of a further setting update for the peripheral device, before completion of applying the at least one setting specified in the setting update message: the first processor-executable instructions may further cause the management server to store, by the first at least one non-transitory processor-readable storage medium, a second update session, the second update session specifying the at least one further setting to apply at the peripheral device based on the further user input indicative of the further setting update; and after completion of applying the at least one setting specified in the setting update message: the first processor executable instructions may further cause the management server to: prepare a second setting update message by the at least one processor of the management server by accessing the second update session and generating the second setting update message to specify the at least one setting to be updated at the peripheral device as specified in the second update session; and transmit, by the first communication module, the second setting update message; the second processor executable instructions may further cause the telematics device to: receive, by the third communication module, the second setting update message from the management server; and transmit, by the second communication module, the second setting update message; and the third processor executable instructions may further cause the peripheral device to: receive, by the fourth communication module, the second setting update message from the telematics device; and apply, by the at least one processor of the peripheral device, the at least one setting specified in the second setting update message. In response to receiving a further user input indicative of a further setting update for the peripheral device, before completion of applying the at least one setting specified in the setting update message: the first processor executable instructions may further cause the management server to: store, by the first at least one non-transitory processor-readable storage medium, at least one further update session, each further update session specifying a respective setting update of the at least one further setting update date to apply at the peripheral device based on the at least one further user input indicative of the at least one further setting update; and after completion of applying the at least one setting specified in the setting update message, sequentially for each further update session of the at least one further update session: the first processor executable instructions may further cause the management server to: prepare an additional setting update message by the at least one processor of the management server by accessing the further update session and generating the additional setting update message to specify the at least one setting to be updated at the peripheral device as specified in the further update session; and transmit, by the first communication module, the further setting update message; the second processor executable instructions may further cause the telematics device to: receive, by the third communication module, the further setting update message from the management server; and transmit, by the second communication module, the further setting update message; and the third processor executable instructions may further cause the peripheral device to: receive, by the fourth communication module, the further setting update message from the telematics device; and apply, by the at least one processor of the peripheral device, the at least one setting specified in the further setting update message.

BRIEF DESCRIPTION OF THE DRAWINGS

Exemplary non-limiting embodiments are described with reference to the accompanying drawings in which:

FIG. 5 is a table which shows a plurality of exemplary settings.

FIGS. 6 and 7 are tables which show updates to exemplary settings.

FIGS. 15, 16, 17, 18, 19, and 20 illustrate exemplary update sessions.

DETAILED DESCRIPTION

Figure 1:
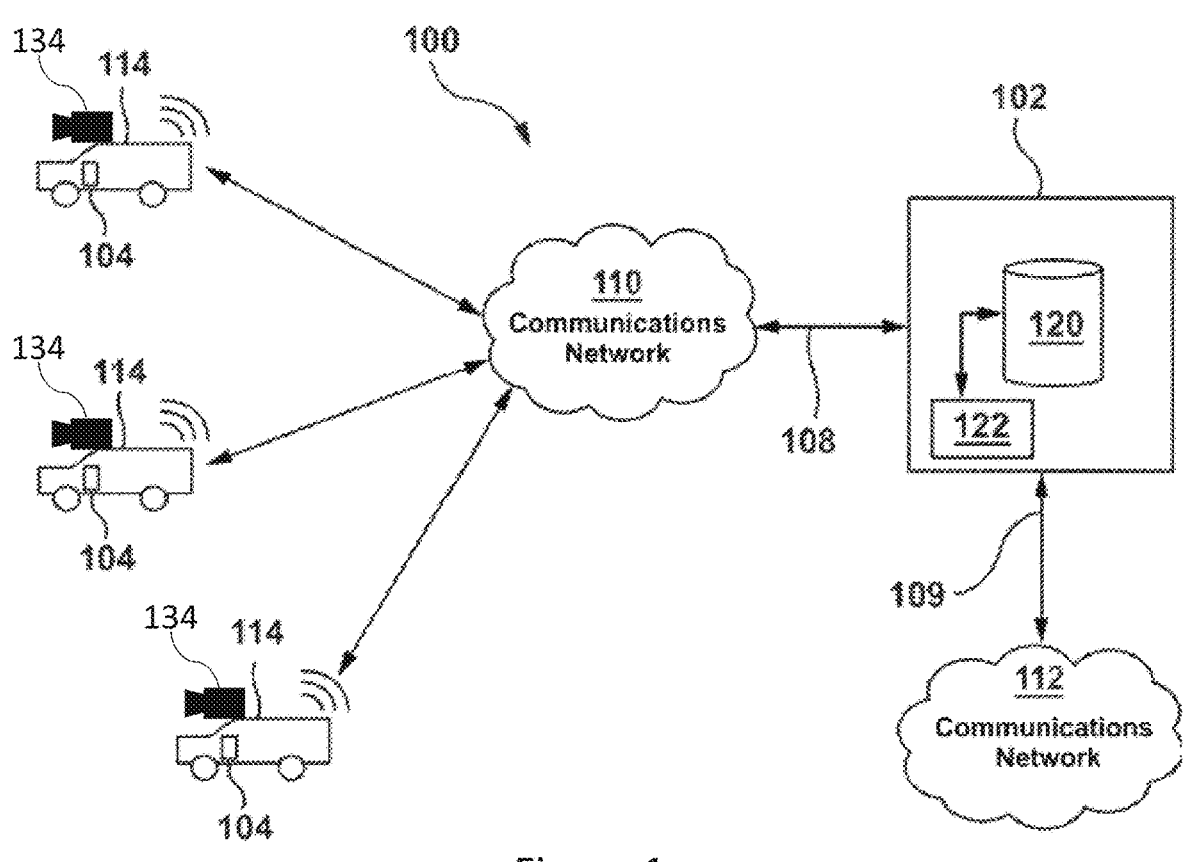
FIG. 1 is a schematic view of a telematics system.

The present disclosure details systems, methods, and devices for updating settings at peripheral devices. The present disclosure sees particular value in vehicle data collection systems, where telematics devices and coupled peripheral devices are positioned at vehicles.

Telematics systems have been employed by fleet owners to monitor use and performance of vehicles in the fleet. A telematics system monitors a vehicle using an onboard telematics device for gathering and transmitting vehicle operation information. For instance, fleet managers can employ telematics to have remote access to real time operation information of each vehicle in a fleet. A vehicle may include a car, truck, recreational vehicle, heavy equipment, tractor, snowmobile or other transportation asset. A telematics device may detect environmental operating conditions associated with a vehicle, for example, outside temperature, attachment status of an attached trailer, and temperature inside an attached refrigeration trailer. A telematics device may also detect operating conditions of an associated vehicle, such as position, (e.g., geographic coordinates), speed, and acceleration, time of day of operation, distance traveled, stop duration, customer location, idling duration, driving duration, among others. Hence, the telematics device collects and transmits data to the telematics system that is representative of the vehicle operation and usage execution. This data may be collected over a time period of sufficient duration to allow for pattern recognition of the vehicle's operation. In an example the duration may be determined to be a number of days between 30 days and 90 days, though in practice any appropriate number of days could be implemented as the duration.

In an exemplary telematics system, raw vehicle data, including vehicle operation information indicative of a vehicle's operating conditions, is transmitted from an onboard telematics device to a remote subsystem, (e.g., data management system which may comprise a cloud system or a management system). Raw vehicle data may include information indicating the identity of the onboard telematics device (e.g., device identifier, device ID) and/or the identity of the associated vehicle the onboard telematics device is aboard. Specific and non-limiting examples of raw vehicle data includes device ID data, position data, speed data, ignition state data, (e.g. indicates whether vehicle ignition is ON or OFF), and datetime data indicative of a date and time vehicle operating conditions were logged by the telematics device. Raw vehicle data transmitted and collected over a period of time forms historical vehicle data which may be stored by the remote subsystem for future analysis of a single vehicle or fleet performance. In practice, a single fleet may comprise many vehicles, and thus large volumes of raw vehicle data (e.g., terabytes, petabytes, exabytes . . . ) may be transmitted to, and stored by, a remote subsystem. Throughout this application, vehicle data collected, processed, and/or transmitted by a telematics monitoring device can be broadly included in "telematic data", among other types of data such as location data discussed later.

In other exemplary telematics systems, a telematics device can have at least one processing unit thereon which processes or filters raw vehicle data, and transmits processed or filtered data. Such systems can reduce the bandwidth required for transmission and required storage capacity for transmitted data.

The use of telematics systems has resulted in improved performance and maintenance of vehicles in the fleet. Additionally, data from telematics systems can also be useful to analyze traffic, to provide information for infrastructure design, planning, and implementation.

Illustrated in FIG. 1 is a simplified block diagram of an exemplary telematics system for gathering and storing vehicle operation information. Telematics system 100 comprises telematics subsystem 102 having a first network interface 108 and onboard telematics devices 104 of vehicles 114 communicatively coupled therewith via communication network 110.

The telematics subsystem 102 in an implementation comprises a management system which is a managed cloud data warehouse for performing analytics on data stored therein. In another implementation, the management system may comprise a plurality of management systems, datastores, and other devices, configured in a centralized, distributed or other arrangement. In some implementations, one or more different management systems may be employed and configured separately or in a centralized, distributed or other arrangement. In the illustrated example, telematics subsystems 102 includes at least one non-transitory processor-readable storage medium 120 and at least one processor 122. The at least one non-transitory processor-readable storage medium 120 can store data on which analytics is performed, and/or can store instructions thereon. Said instructions, when executed by the at least one processor 122, cause the telematics subsystem to perform the desired operations, analysis, or data collection/aggregation. The telematics subsystem 102 can also be referred to as a management server. Such a management server can be a single device, or can be a distributed arrangement as discussed above.

Communication network 110 may include one or more computing systems and may be any suitable combination of networks or portions thereof to facilitate communication between network components. Some examples of networks include, Wide Area Networks (WANs), Local Area Networks (LANs), Wireless Wide Area Networks (WWANs), data networks, cellular networks, voice networks, among other networks, which may be wired and/or wireless. Communication network 110 may operate according to one or more communication protocols, such as, General Packet Radio Service (GPRS), Universal Mobile Telecommunications Service (UMTS), GSM, Enhanced Data Rates for GSM Evolution (EDGE), LTE, CDMA, LPWAN, Wi-Fi™, Bluetooth™, Ethernet, HTTP/S, TCP, and CoAP/DTLS, or other suitable protocol. Communication network 110 may take other forms as well.

Telematics system 100 may comprise another network interface 109 for communicatively coupling to another communication network 112. In an implementation, communication network 112 may comprise a communication gateway between the fleet owners and the telematics system 100.

Also shown in FIG. 1 are vehicles 114, each thereof having aboard the onboard telematics devices 104. A vehicle may include a car, truck, recreational vehicle, heavy equipment, tractor, snowmobile, or other transportation asset. Onboard telematics devices 104 may transmit raw vehicle data associated with vehicles 114 through the communication network 110 to the telematics subsystem 102.

Three telematics devices 104 are described in this example for explanation purposes only and embodiments are not intended to be limited to the examples described herein. In practice, a telematics system may comprise many vehicles 114, such as hundreds, thousands and tens of thousands or more. Thus, huge volumes of raw vehicle data may be received and stored by remote telematics subsystem 102.

In general, telematics devices 104 comprise sensing modules configured for sensing and/or measuring a physical property that may indicate an operating condition of a vehicle. For example, sensing modules may sense and/or measure a vehicle's position, (e.g., GPS coordinates), speed, direction, rates of acceleration or deceleration, for instance, along the x-axis, y-axis, and/or z-axis, altitude, orientation, movement in the x, y, and/or z direction, ignition state, transmission and engine performance, and times of operation among others. One of ordinary skill in the art will appreciate that these are but a few types of vehicle operating conditions that may be detected.

Telematics device 104 may comprise a sensing module for determining vehicle position. For instance, the sensing module may utilize Global Positioning System (GPS) technology (e.g., GPS receiver) for determining the geographic position (Lat/Long coordinates) of vehicle 114. Alternatively, the sensing module utilizes another a global navigation satellite system (GNSS) technology, such as, GLONASS or BeiDou. Alternatively, the sensing module may further utilize another kind of technology for determining geographic position. In addition, the sensing module may provide other vehicle operating information, such as speed. Alternatively, the telematics device 104 may communicate with a plurality of sensing modules for a vehicle.

Alternatively, vehicle position information may be provided according to another geographic coordinate system, such as, Universal Transverse Mercator, Military Grid Reference System, or United States National Grid.

In general, a vehicle 114 may include various control, monitoring and/or sensor modules for detecting vehicle operating conditions. Some specific and non-limiting examples include, an engine control unit (ECU), a suspension and stability control module, a headlamp control module, a windscreen wiper control module, an anti-lock braking system module, a transmission control module, and a braking module. A vehicle may have any combination of control, monitoring and/or sensor modules. A vehicle may include a data/communication bus accessible for monitoring vehicle operating information, provided by one or more vehicle control, monitoring and/or sensor modules. A vehicle data/communication bus may operate according to an established data bus protocol, such as the Controller Area Network bus (CAN-bus) protocol that is widely used in the automotive industry for implementing a distributed communications network. Specific and non-limiting examples of vehicle operation information provided by vehicle monitoring and/or sensor modules include, ignition state, fuel tank level, intake air temp, and engine RPM among others.

Telematics device 104 may comprise a monitoring module operable to communicate with a data/communication bus of vehicle 114. The monitoring module may communicate via a direct connection, such as, electrically coupling, with a data/communication bus of vehicle 114 via a vehicle communication port, (e.g., diagnostic port/communication bus, OBDII port). Alternatively, the monitoring module may comprise a wireless communication interface for communicating with a wireless interface of the data/communication bus of vehicle 114. Optionally, a monitoring module may communicate with other external devices/systems that detect operating conditions of the vehicle.

Telematics device 104 may be configured to wirelessly communicate with telematics subsystem 102 via a wireless communication module. In some embodiments, telematics device 104 may directly communicate with one or more networks outside vehicle 114 to transmit data (such as telematic data) to telematics subsystem 102. A person of ordinary skill will recognize that functionality of some modules may be implemented in one or more devices and/or that functionality of some modules may be integrated into the same device.

Telematics devices 104 may transmit raw vehicle data (or telematic data), indicative of vehicle operation information collected thereby, to telematics subsystem 102. The raw vehicle data may be transmitted at predetermined time intervals, (e.g. heartbeat), intermittently, and/or according to other predefined conditions. Raw vehicle data (or telematic data) transmitted from telematics devices 104 may include information indicative of device ID, position, speed, ignition state, and date and time operating conditions are logged, for instance, in an onboard datastore. One of ordinary skill in the art will appreciate that raw vehicle data may comprise data indicative of numerous other vehicle operating conditions.

Raw vehicle data may be transmitted from a monitoring device when a vehicle is moving, stationary, and during both ON and OFF ignition states.

Also shown in FIG. 1 are image sensors 134, each aboard a respective vehicle 104. Each of image sensors 134 could for example be a camera, such as a video camera. Such image sensors capture image data (or video data, as a sequence of images) in a field of view of the respective image sensor. In some cases, an image sensor is positioned and oriented to capture image data representing a field of view outside the vehicle (e.g. a dash cam, rear view cam, or other camera pointed externally to the vehicle). In some cases, an image sensor is positioned and oriented to capture image data representing a field of view inside the vehicle (e.g. a driver-facing camera, a camera aimed at an instrument panel, or other camera pointed internally in the vehicle).

Similar to telematic data, image data captured by image sensors 134 can be transmitted to telematics subsystem 102 by communications network 110. In some implementations, communication hardware of telematics devices can have limited bandwidth capabilities. For example, transmission speed or quantity from a telematics device can be throttled to reduce power consumption. As another example, a telematics device may be old, such that the communication hardware thereon is inherently limited in capabilities. In such cases, communication hardware of the telematics device may be inadequate or inappropriate for transmitting image data from an image sensor 134 over communications network 110. To address this, image sensors 134 may include dedicated communication hardware for communicating over communications network 110. This is described in detail with reference to FIG. 2 below.

Figure 2:
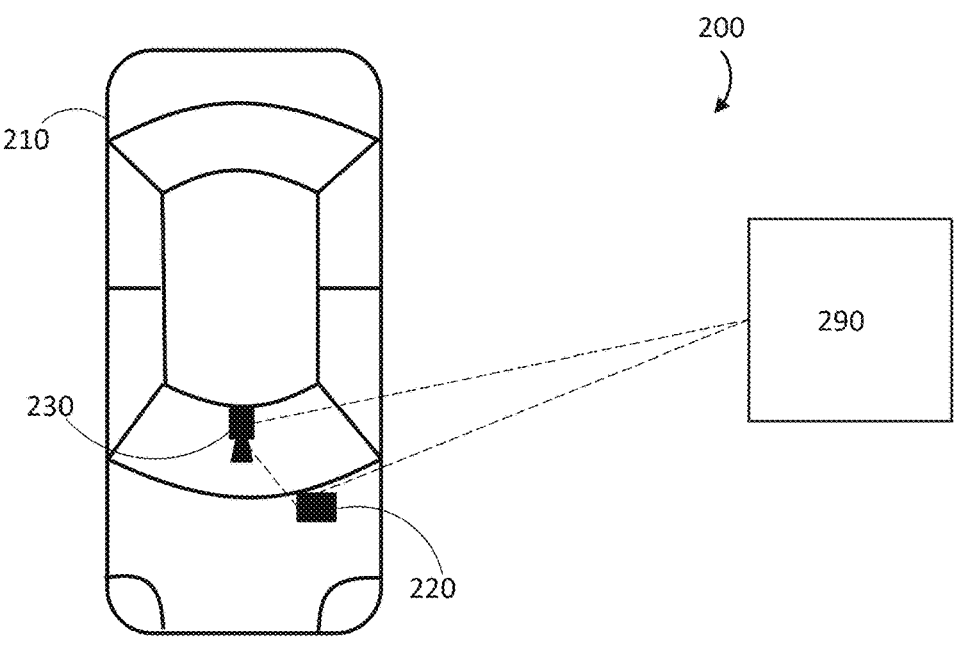
FIG. 2 is a schematic view of a system of devices which are pertinent to a vehicle, in accordance with at least one illustrated example.

FIG. 2 is a schematic diagram which illustrates an exemplary system 200, where a peripheral device and telematics device are positioned at a vehicle and able to communicate with a management server remote from the vehicle. In particular, FIG. 2 shows a vehicle 210. In the illustrated example, vehicle 210 is a sedan-type car, but this discussion applies to any appropriate type of vehicle, such as those discussed earlier. A telematics device 220 is positioned at vehicle 210. The telematics device 220 could be installed (permanently or removably) to the vehicle 210. For example, the telematics device may comprise a monolithic device which plugs into a data port of vehicle 210 (such as the OBDII port) to receive power and data from the vehicle. As another example, the telematics device may comprise multiple components positioned in different locations of the vehicle which communicate with each other. A peripheral device 230 is also positioned at vehicle 210. In the illustrated example, the peripheral device 230 is an image capture device installed to vehicle 210 so as to look out the front windshield of vehicle 210. In alternative implementations, more than one image capture device can be positioned at the vehicle, pointed in any appropriate direction (e.g. a rear-facing camera, in-cab facing camera, side facing cameras, etc.) A plurality of image capture devices can be implemented collectively as a peripheral device (e.g. the image capture devices are controlled commonly), or as a plurality of respective peripheral devices. In alternative implementations, the peripheral device could comprise at least one device which is not an image capture device, such as peripheral sensors, a peripheral battery device, a key activation or storage device, or any other appropriate device. Telematic device 220 and peripheral device 230 are communicatively coupled with each other; detailed implementations are discussed later with reference to FIG. 3.

FIG. 2 also shows a management server 290. As discussed earlier with reference to telematics subsystem 102, management server 290 can comprise one device, or can comprise a plurality of devices or distributed computing resources (e.g. over a cloud or server warehouse). Telematic device 220 and peripheral device 230 are each communicatively coupled to management server 290. While FIG. 2 illustrates this communicative coupling in a direct manner, the communicative coupling can be indirect (e.g. over a communication network such as a cellular or internet network).

Figure 3:
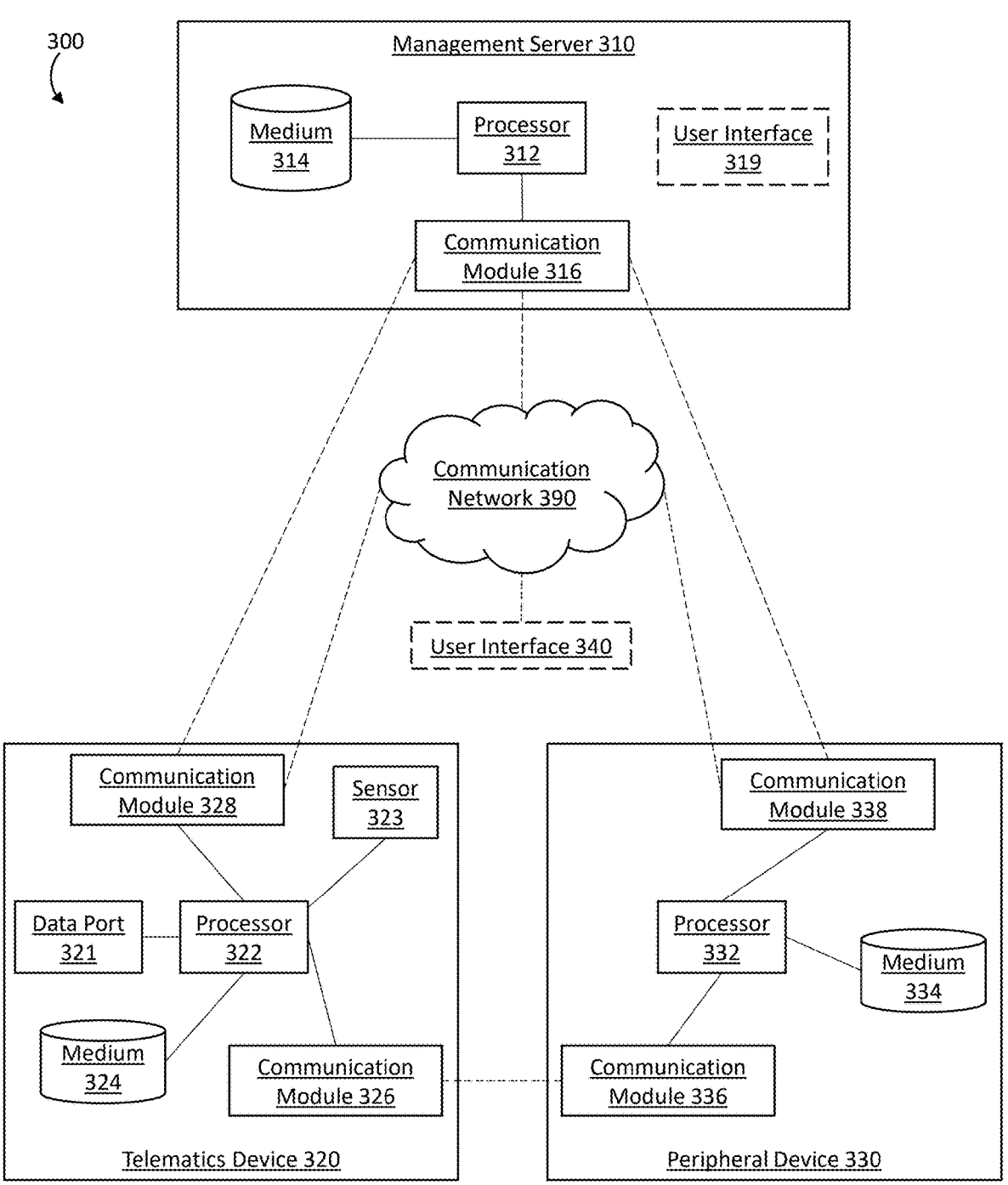
FIG. 3 is a schematic view of a system of devices which communicate with each other, in accordance with at least one illustrated example.

FIG. 3 is a schematic diagram showing a system 300 including exemplary hardware for the management servers, telematics devices, and peripheral devices discussed herein. The hardware shown in FIG. 3 is not exhaustive, and any appropriate additional hardware can be included in each of the devices.

FIG. 3 shows a management server 310, which includes a first at least one processor 312, a first at least one non-transitory processor-readable storage medium 314, and a first communication module 316. The first at least one non-transitory processor-readable storage medium 314 can store (among other data) processor-executable instructions which, when executed by the first at least one processor 312, control operation of the management server 310 (e.g. cause the management server 310 to perform any appropriate actions, such as actions in any of methods 400, 900, 1000, and 1100 discussed later with reference to FIGS. 4, 9, 10, and 11).

FIG. 3 also shows a telematics device 320, which includes a second at least one processor 322, a second at least one non-transitory processor-readable storage medium 324, a second communication module 326, and a third communication module 328. Telematics device 320 also includes means for receiving, collecting, or capturing telematics data as described earlier. In the illustrated example in FIG. 3, telematics device 320 includes a data port 321, which connects to a corresponding port of a vehicle (e.g. a diagnostics port such as an OBDII port), in order to receive vehicle-related data from the vehicle. Also in the illustrated example, telematics device 320 includes at least one sensor 323, which captures sensor data related to the vehicle (such as location data, inertial data, or any other appropriate type of sensor data as discussed earlier). The second at least one non-transitory processor-readable storage medium 324 can store (among other data) processor-executable instructions which, when executed by the second at least one processor 322, control operation of the telematics device 320 (e.g. cause the telematics device 320 to perform any appropriate actions, such as actions in any of methods 400, 900, 1000, and 1100 discussed later with reference to FIGS. 4, 9, 10, and 11).

FIG. 3 also shows a peripheral device 330 which includes at least one third processor 332, at least one third non-transitory processor-readable storage medium 334, a fourth communication module 336, and an optional fifth communication module 338. Peripheral device 330 can be any appropriate type of peripheral device (e.g. image capture device, battery device, processing device, key-storage device, as non-limiting examples). To this end, peripheral device 330 can also include any hardware appropriate to enable peripheral device 330 to serve its intended purpose. The third at least one non-transitory processor-readable storage medium 334 can store (among other data) processor-executable instructions which, when executed by the third at least one processor 332, control operation of the peripheral device 330 (e.g. cause the peripheral device 330 to perform any appropriate actions, such as actions in any of methods 400, 900, 1000, and 1100 discussed later with reference to FIGS. 4, 9, 10, and 11).

The labels "first", "second", "third", "fourth", and "fifth" are merely to label different components, and do not indicate or imply any specific sequence or ordinance of components.

The first communication module 316, third communication module 328, and fifth communication module 338 are long-range communication modules, for communication between management server 310 and telematics device 320 and/or peripheral device 330. For example, communication modules 316, 328, and 338 can be cellular modems, which enable communication of management server 310, telematics device 320, and peripheral device 330 over at least one cellular network. Such a cellular network is one example of communication network 390 shown in FIG. 3, via which management server 310 communicates with telematics device 320 and peripheral device 330. Communication network 390 is optional, and in some implementations management server 310 could communicate directly with telematics device 320 and peripheral device 330, as also shown in FIG. 3 by dashed lines. The first communication module 316, third communication module 328, and fifth communication module 338 do not all have to be the same type of modules, nor is communication network 390 limited to a single communication network. For example, first communication module 316 can be an internet capable module (e.g. an ethernet port, a wireless network module such as a WiFi™ module, or any other appropriate module) which connects to the internet; third communication module 328 can be a cellular module which connects to a cellular network of a first cellular provider; and communication module 338 can be a cellular module which connects to a cellular network of a second cellular provider. In such an implementation, each of the first communication module 316, third communication module 328, and fifth communication module 338 connect to the internet and communicate over the internet, but via different mechanisms.

Second communication module 326 and fourth communication module 336 are generally short-range communication modules. In some implementations, second communication module 326 and fourth communication module 336 can be wired communication modules (such as USB ports), such that telematics device 320 and peripheral device 330 communicate with each other over a wired connection. In other implementations, second communication module 326 and fourth communication module 336 are wireless communication modules, such as Bluetooth™, Zigbee™, WiFi™, or any other appropriate type of short-range wireless connection.

As discussed later, management server 310 can receive user input, for example from a manager of a fleet of vehicles, an owner of devices in the system 300, or an installer of devices in the system 300. To this end, FIG. 3 illustrates exemplary user interfaces 319 and 340, either or both of which could be implemented as appropriate for a given application.

In an illustrated implementation, user interface 319 is included in management server 310, and could include for example any appropriate devices, such as a keyboard, mouse, touchscreen, microphone, etc. by which input can be received from a user. Such a user interface 319 can be useful, for example, in an application where management server 310 and user interface 319 are located together (e.g., user interface 319 is part of a user terminal integrated with management server 319). Note that user interface 319 does not necessarily have to be monolithically combined with management server 310 (although it could be), but rather user interface 319 can be implemented such that user inputs are received at management server 319 without being provided through first communication module 316. For example, where first communication module 316 is used for communication via the internet, user interface 319 could communicate with management server 310 via a more local means, such as a wired connection, wireless network, or short-range wireless pairing.

In some implementations, user interface 340 is included, which is separate from management server 310. In some cases, user interface 340 is a client device, such as a personal computer, tablet, smartphone, PDA, or any other appropriate device. User interface 340 communicates with management server 310 via communication network 390. For example, user interface 340 can be included in a device remote from management server 310, which connects to the internet to transmit indications of user inputs received at user interface 340 to management server 310.

In an exemplary implementation, user interface 340 is included in a portable device used by an installer of telematics device 320 and/or peripheral device 330. For example, user interface 340 could be included in a smartphone of the installer (e.g. touch screen, keyboard, buttons, microphone, or other interfaces). When installing the telematics device 320 and/or peripheral device 330, the installer may input initialization settings to be applied at the peripheral device 330. For example, the installer can use their smartphone to log into an application or portal for initializing the devices, and can input appropriate settings. In this context, the user interface 340 can be proximate the telematics device 320 and the peripheral device 330 (in that the installer is at the vehicle where the telematics device 320 and the peripheral device 330 are being installed). These settings can be communicated to the management server 310 and to the telematics device 320 and peripheral device 330, as discussed in detail later with reference to FIGS. 4, 9, 10, and 11.

In another exemplary implementation, user interface 340 is remote from the telematics device 320 and the peripheral device 330, and used to update settings of the already-installed peripheral device 330 (whether previously installed by an installer, or whether included in the vehicle be default). For example, user interface 340 could be an access device (such as a personal device, an access terminal, or any other appropriate device) used by an owner or manager of the vehicle. In this implementation user interface 340 can be used to update settings at the peripheral device 330, on an as needed basis even long-after installation of the peripheral device 330. For example, the manager or owner can log into an application or portal for updating settings at the devices, and can input appropriate settings. These settings can be communicated to the management server 310 and to the telematics device 320 and peripheral device 330, as discussed in detail later with reference to FIGS. 4, 9, 10, and 11.

Figure 14:
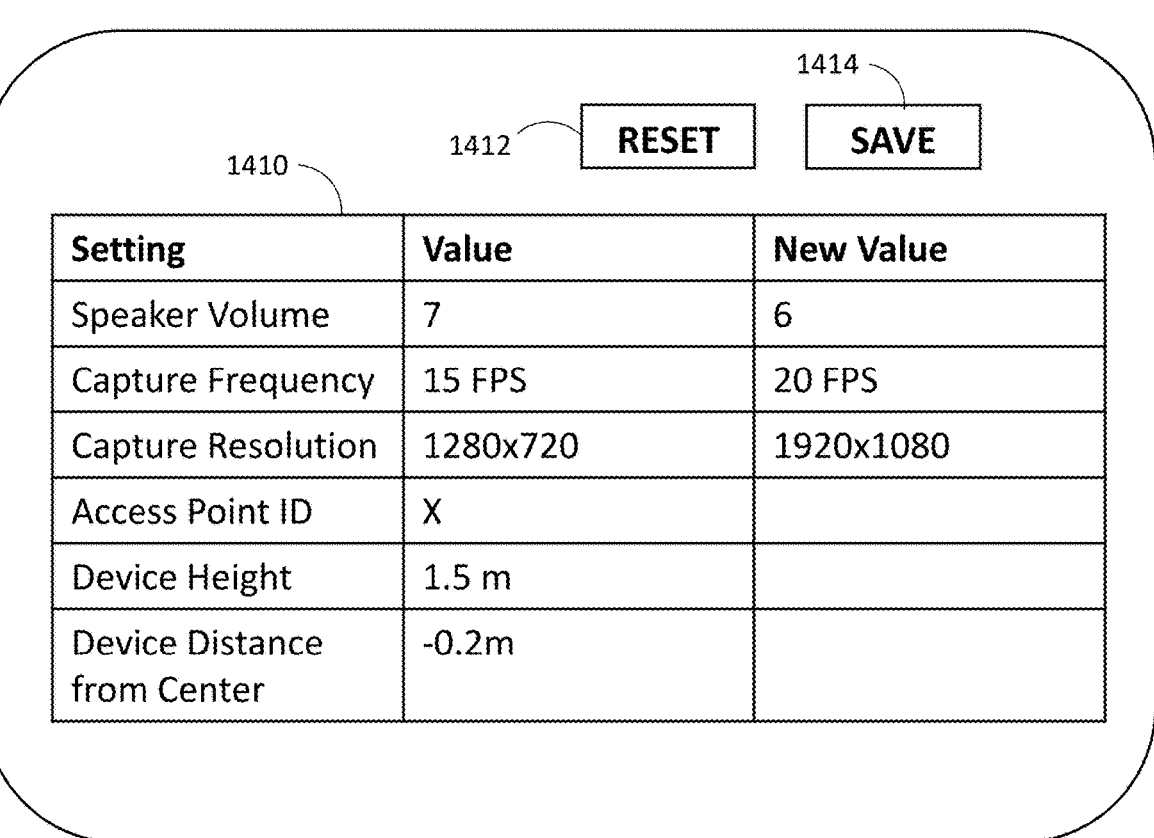
FIG. 14 is an exemplary user interface for inputting updates to settings for a peripheral device.

An exemplary presentation of user interface is shown in FIG. 14, discussed later.

The above discussed implementations are not exclusive to each other. In some cases, a user interface can be used to initialize settings at telematics device 320 and peripheral device 330, and a user interface can be used to update settings at the devices as needed. These user interfaces could be the same user interface (e.g. the installer/manager can initialize devices, and also update them later), or could be different user interfaces (e.g. the installer can initialize devices, and a manager can update settings at the devices later with a different user interface).

Figure 4:
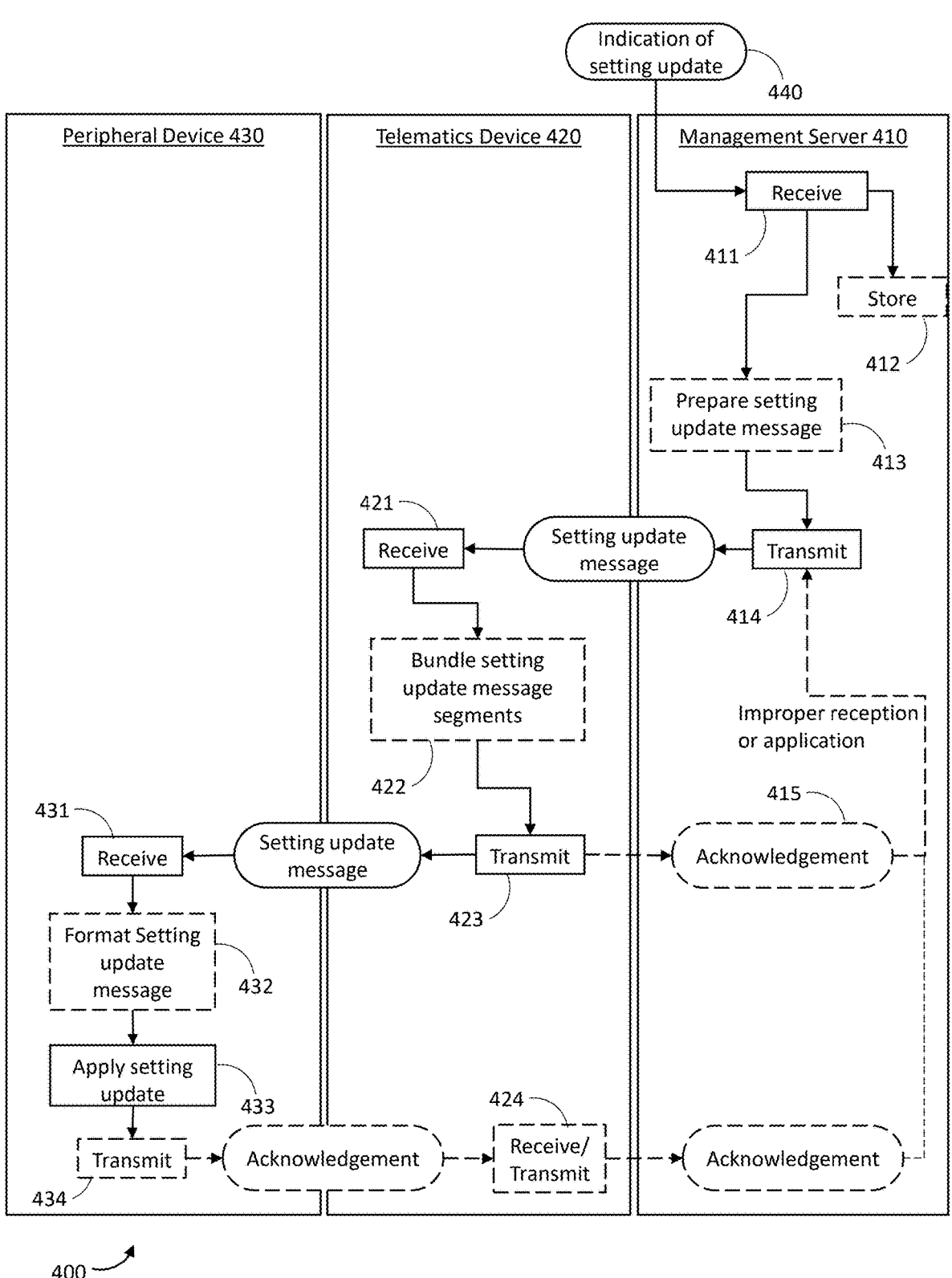
FIG. 4 is a flowchart diagram of a method for updating settings at a peripheral device.

FIG. 4 is a flowchart diagram which illustrates an exemplary method 400 for updating settings at a peripheral device. Method 400 as illustrated includes acts performed by a management server 410 (illustrated as acts 411, 412, 413, 414, and 415), acts performed by a telematics device 420 (illustrated as acts 421, 422, and 423), and acts performed by a peripheral device 430 (illustrated as acts 431, 432, and 433). One skilled in the art will appreciate that additional acts could be added, acts could be removed, or acts could be reordered as appropriate for a given application. For example, at least acts 412, 413, 422, and 432 are optional or include optional aspects, and could be selectively removed, replaced, or altered as appropriate for a given application.

With reference to the examples illustrated in FIGS. 1, 2, and 3, acts can be performed by appropriate components of systems such as system 100 in FIG. 1, system 200 in FIG. 2, and/or system 300 in FIG. 3. For example, acts of transmission, reception, or retrieval can be performed by appropriate communication modules; acts of preparing messages, comparison, determination, installing, or updating can be performed by an appropriate at least one processor; acts of storing or providing access can be performed by an appropriate at least one non-transitory processor-readable storage medium. Further, any of the discussed at least one non-transitory processor-readable storage mediums, can have processor-executable instructions stored thereon, which when executed by a respective at least one processor cause a respective device or component to perform a given act of method 400. Further, unless context indicates otherwise, acts of reception or receiving can include appropriate acts of data intake or formatting, such as decompressing, decrypting, or routing to appropriate internal hardware. Throughout the discussion of method 400, reference is made to elements of management server 310 which can be implemented as management server 410 in FIG. 4, to telematics device 320 which can be implemented as telematics device 420 in FIG. 4, and peripheral device 330 which can be implemented as peripheral device 430 in FIG. 4, for example.

In the context of method 400, peripheral device 430 is utilized in light of at least one adjustable setting. Example settings are discussed later with reference to FIGS. 5, 6, 7, and 8. The settings can be stored on at least one non-transitory processor-readable storage medium of the peripheral device (such as non-transitory processor-readable storage medium 334 in FIG. 3), for example as one or more settings file, or as respective key and value pairs.

At 411, management server 410 receives an indication of a setting update 440. Throughout this disclosure, a "setting update" refers to a situation where one or more settings of the peripheral device 430 are specified to be changed or confirmed. Examples of receiving the indication of the setting update are discussed earlier with reference to FIG. 3. For example, the indication of the setting update can be input by a user to a user interface, and transmitted from the user interface (or device which includes the user interface), and received by the management server 410 (e.g. via first communication module 316). As another example, the indication of the setting update can be input by a user to a user interface at the management server 410. In some cases, a user can input a desired setting, without knowledge of a current state of said setting at a peripheral device. Applying such a desired setting in the context of the disclosed methods can entail "confirming" the setting, e.g. be changing the setting at the peripheral device to the desired setting if need be, checking that the setting at the peripheral device is already set as desired, or applying the desired setting regardless of a current state of the setting at the peripheral device. FIG. 14 discussed later illustrates an exemplary user interface by which setting changes or updates can be input. In some implementations, receiving the indication of the setting update 440 at 411 comprises retrieving, receiving, or otherwise accessing a stored indication of the setting update (e.g. a next or pending update session, as discussed later with reference to FIGS. 15, 16, 17, 18, 19, and 20).

At 412, the management server 410 optionally stores the setting update (e.g. on the at least one non-transitory processor-readable storage medium 314). For example, the management server 410 can keep a record or database of current settings for one or more peripheral devices which are managed by the management server 410. In this way, the status of settings for peripheral devices can be known at the management server 410. This in turn enables the management server to limit setting update related transmissions to only those which are needed. For example, management server 410 can avoid transmitting setting "updates" where no setting is actually being changed at a peripheral device, or management server 410 can limiting setting update transmissions to only specific settings which are actually changed (instead of transmitting an entire settings file, for example). This is discussed in more detail later with reference to FIGS. 6, 7, 15, 16, 17, 18, 19, and 20.

Act 412 is optional in the sense that, in some implementations management server 411 may directly send a setting update message (discussed later with reference to act 413), without storing the actual settings or updates. That is, in some implementations management server 411 may simply pass the settings updates on to be received at the peripheral device 430.

At 413, the management server 410 (by the at least one processor 312) prepares a setting update message. Generally, preparing the setting update message includes preparing the setting update message to specify at least one setting to apply at the peripheral device, based on the indication of the setting update 440 received at 411. In some implementations, preparing the setting update message further includes preparing the setting update message to specify at least one setting to apply at the peripheral device which is not based on the user input received at 440. For example, the setting update message could include default or saved settings stored at management server 410. In some implementations, preparing the setting update message includes formatting setting updates into a format interpretable by the peripheral device 430, or generating setting update instructions which, when executed by the peripheral device 430 (by the at least one processor 332), cause the peripheral device to update corresponding settings thereat. In some implementations, preparing the setting update message includes encrypting the setting update message, for later decryption once received by the peripheral device 430. In some implementations, preparing the setting update message includes preparing a plurality of "message segments", which act as portions of an entire setting update which are to be sent piece-wise and in sequence to be received at the peripheral device 430. Message segments are discussed in more detail later with reference to FIG. 8.

The above implementations are not necessarily exclusive to each other. For example, the setting update message can be prepared at 413 by generating setting update instructions, parsing the setting update instructions into a plurality of message segments, and encrypting each of the message segments. This is one exemplary combination, but any combination of actions can be included in act 413, such as those discussed above, and any other appropriate action.

At 414, management server 410 transmits (e.g. by the first communication module 316) the setting update message to be received at 421 by telematics device 420 (e.g. by the third communication module 328). In implementations where the setting update message includes a plurality of sequential message segments, act 414 can include transmitting each message segment of the plurality of message segments in sequence.

At 422, the telematics device 420 (e.g. by the at least one processor 322) optionally bundles setting update message segments together. Because communication between the telematics device 420 and management server 410 is long-range communication (e.g. over communication network 390), there is risk that communications can fail, be interrupted, or result in received data being corrupted. Transmitting the setting update message as plurality of message segments alleviates this, by enabling retransmission of message segments which are not properly received. On the other hand, communication between the telematics device 420 and the peripheral device 430 is short-range (e.g. wired), and is less prone to transmission errors, and can have less bandwidth constraints should any data need to be retransmitted. To this end, at 422 the plurality of message segments can be bundled together as at least one set of bundled message segments, for transmission to the peripheral device 430 at 423. In some implementations, the at least one set of bundled message segments comprises a single set of bundled message segments which includes all of the message segments of the setting update message. In other implementations, the at least one set of bundled message segments includes a plurality of sets of bundled message segments, each bundled message segment including a respective portion of the setting update message.

Act 422 is optional, and in some implementations the plurality of message segments are transmitted to the peripheral device 430 without any bundling. For example, in some implementations, communication between telematics devices and peripheral devices may have strict size limitations, such that large communications between telematics devices and peripheral devices need to be divided into a plurality of segments, such that bundling is not appropriate.

At 423, the setting update message (including the plurality of message segments, or any bundles thereof) are transmitted from telematics device 420 (e.g. by the second communication module 326), and at 431 are received at the peripheral device 430 (e.g. by the fourth communication module 336). In implementations where the setting update message includes a plurality of sequential message segments, act 423 includes transmitting each message segment of the plurality of message segments in sequence.

Optionally, an acknowledgement 415 is transmitted from telematics device 420 (e.g. from third communication module 328) to management server 410 (e.g. at first communication module 316). Acknowledgement 415 indicates proper or improper reception of the setting update message and any message segments thereof. For example, the acknowledgement 415 can expressly indicate proper reception of each message segment (which is properly received). In some implementations, the acknowledgement 415 can expressly indicate improper reception of any message segment (which were not properly received). In response to the acknowledgement, any improperly received message segments can be retransmitted at 414.

In some implementations, aspects of the acknowledgment can be implied (or non-explicit). For example, the acknowledgement 415 could indicate proper reception of each message segment which is properly received, and indicate nothing about message segments which are not properly received. Management server 410 can then retransmit at 414 any message segments for which an indication of proper reception was not received. As another example, the acknowledgement 415 could indicate improper reception of each message segment which is not properly received, and indicate nothing about message segments which are properly received. Management server 410 can then retransmit at 414 any message segments for which an indication of improper reception was received.

In some implementations, acknowledgement 415 is transmitted in response to the entirety of the setting update message (i.e. all message segments). In other implementations, acknowledgement 415 includes a plurality of acknowledgements, each acknowledgement corresponding to a particular message segment (that is, the status of each message segment is communicated via a separate acknowledgment).

After receiving the setting update message (or a message segment of the setting update message), the peripheral device 430 can optionally format (e.g. by the at least one processor 332) the setting update message. For example, the peripheral device 430 can take each message segment of the setting update message and format them together as the full setting update message, or in another format such as instructions for applying the setting update message or data indicating the setting updates to be applied. As another example, if the setting update message is encrypted, the peripheral device 430 can decrypt the setting update message.

At 433, the peripheral device 430 applies the setting update specified in the setting update message. In an exemplary implementation, applying the setting update comprises replacing a setting file stored at the peripheral device 430 (e.g. by the at least one non-transitory processor-readable storage medium 334) with a new setting file included in (or generated based on) the setting update message. In another exemplary implementation, the peripheral device 430 accesses a settings file or settings registry (e.g. stored at the at least one non-transitory processor-readable storage medium 334), and changes any setting values which are indicated in (or which differ from) the setting update message. In cases where the setting update message comprises a plurality of message segments, applying the setting update at 433 can in some implementations comprise applying the setting update message as a whole after all message segments are received, whereas in other implementations settings specified in each message segment can be applied at 433 after reception of the message segment (even before all message segments are received).

Optionally, at 434 the peripheral device 430 transmits an acknowledgement of the status update. This could be implemented in several different ways. In one implementation, the peripheral device 430 can transmit an acknowledgement that the status update is successfully (or unsuccessfully) applied (at 433). In another implementation, act 434 can be before act 433, and comprise transmitting an acknowledgement that the status update is successfully (or unsuccessfully) received (at 431). In yet another implementation, act 434 can occur twice: once before act 433 comprising transmitting an acknowledgement that the status update is successfully (or unsuccessfully) received (at 431), and again after act 433 comprising transmitting an acknowledgement that the status update is successfully (or unsuccessfully) applied (at 433).

In some implementations, the acknowledgement transmitted at 434 can be sent to and received by the telematics device 420 (e.g. via fourth and second communications modules 336 and 326), and forwarded to the management server 410 (e.g. via third communication module 328 and first communication module 316). That is, the acknowledgment can be transmitted to the management server 410 indirectly via the telematics device 420.

In some implementations, the acknowledgement transmitted at 434 can be sent to and received by the management server 410, without routing through the telematics device 420 (e.g. transmitted via fifth and first communications modules 338 and 316).

In response to receiving an acknowledgement that the status update was not properly applied or received at the peripheral device 430, or inferring that the status update was not properly applied or received at the peripheral device 430 based on a lack of acknowledgement that the status update was properly applied or received, management server 410 can retransmit the setting update message at 414.

FIG. 5 shows a settings table 500 for a particular peripheral device. Settings table 500 illustrates a number of exemplary settings and associated values, which could be stored at a peripheral device or management server in any appropriate format (e.g. as a settings file or settings registry). The specific settings shown in FIG. 5 are merely exemplary; any settings could be specified in addition or instead of those shown, and/or some settings could be removed, as appropriate for a given application. Further, the "values" for each of the settings shown in FIG. 5 and discussed below are merely exemplary; settings can be set at any value appropriate for a given application.

In settings table 500, each exemplary setting is shown with a unique Setting ID (e.g. a setting key) and a value for the respective setting.

The setting "Speaker Volume" is shown with an ID of 1, and a value of 7. Speaker volume in this example represents the output power of a speaker on a peripheral device, and the value of 7 can indicate relative volume out of a maximum value (e.g. out of ten, one hundred, or any other appropriate value).

The setting "Capture Frequency" is shown with an ID of 2, and a value of 15 FPS (frames per second). Capture frequency in this example represents a frequency at which image data is captured by the peripheral device (where the peripheral device includes an image capture device or camera).

The setting "Capture Resolution" is shown with an ID of 3, and a value of 1280×720 (which can be stored as a pair of values). Capture resolution in this example is a horizontal number of pixels (1280) and a vertical number of pixels (720) for image data to be captured, stored, or transferred from the peripheral device. Depending on specific implementation details of an image capture device at a peripheral device, capture resolution of image data may not be controllable. However, captured image data can be downscaled for the purposes of storage or transmission; a capture resolution setting as shown in FIG. 5 can adjusted the extent of such downscaling.

The setting "Access Point ID" is shown with an ID of 4 and a value of "X". In this example, X represents any appropriate means for specifying an access point, such as an Access Point Name, an Access Point address, routing information for the access point, etc. Access points are discussed in more detail later with reference to FIG. 12.

The setting "Device Height" is shown with an ID of 5 and a value of 1.5 m (meters). In this example, Device height refers to a vertical position at which the peripheral device is installed in the vehicle, and can be measured from a ground level on which the vehicle is positioned. Device height can be specified in any appropriate units of measurement.

The setting "Device Distance from Center" is shown with an ID of 6 and a value of −0.2 m (meters). In this example, Device Distance from Center refers to a horizontal position at which the peripheral device is installed in the vehicle, relative to a horizontal center of the vehicle. Device Distance from center can be specified in any appropriate units of measurement. In the example, −0.2 m refers to the peripheral device being installed left of a center of the vehicle by 20 cm (from the perspective of a driver of the vehicle), but any appropriate position labelling scheme can be used instead.

Device Height and Device Distance from Center are valuable settings where the peripheral device is or includes an image capture device. A position of the image capture device in the vehicle impacts a perspective of images captured thereby, and can thus impact analysis of images captured by the image capture device. Having the Device Height and Distance from Center stored as settings of the peripheral device can be useful to provide context and or data for analysis of image data, and thus improve accuracy of analysis results. Device Height and Device Distance from Center can be measured by an installer of the peripheral device, and input as settings via method 400 in FIG. 4 at a time of initializing the peripheral device.

While not explicitly shown in FIG. 5, another setting could be "Image Capture Enabled", or similar. Such a setting could specify whether an image capture device (included in or coupled to the peripheral device) can capture image data. Such a setting is useful for example where vehicles enter sites where image capture or recording is forbidden. In such scenarios, image capture can be selectively disabled to satisfy image capture rules or regulations.

Method 400 can be performed where one or more settings are to be updated (i.e. a user inputs a setting change for one or more settings). While Settings table 500 in FIG. 5 shows each setting with a Setting name, such a setting name is not necessarily transmitted or stored at the peripheral device, and instead settings can be identified by the Setting ID instead. This can reduce transmission bandwidth when transmitting setting updates, and can reduce storage requirements for storing settings information. Setting names however are useful when presenting setting options to a user (as shown in FIG. 14 discussed later), so the user can understand what different settings are.

In some implementations or cases, the setting update message which is transmitted by management server 410 at 414 to eventually be received at peripheral device 430 can include all of the settings for the peripheral device, even if only a single setting is to be changed. For example, the setting update message can include a settings file for all available settings (a file which stores a settings table or registry such as shown in FIG. 5, or other appropriate format). Such an implementation can be advantageous in cases where management server 410 is not aware of current settings of a peripheral device 430 (e.g. an initialization step where the peripheral device is newly installed), and thus can update settings at the peripheral device 430 to conform to settings specified by a user, default settings stored at management server 410, or a combination thereof.

However, transmitting settings data for all of the settings can be an inefficient use of transmission bandwidth, if only a subset of settings are changed. FIGS. 6 and 7 discussed below provide alternative implementations which address this issue.

FIG. 6 shows a settings update table 600 for a particular peripheral device. Settings update table 600 illustrates the exemplary settings shown in FIG. 5, and description of these settings for FIG. 5 is applicable to FIG. 6 unless context dictates otherwise. Any settings could be specified in addition or instead of those shown, and/or some settings could be removed, as appropriate for a given application. Further, the "values" for each of the settings shown in FIG. 6 are merely exemplary; settings can be set at any value appropriate for a given application.

In FIG. 6, settings update table 600 includes values only for settings which are changed or updated. In particular, the setting values for Speaker Volume, Access Point ID, Device Height, and Device Distance from Center are shown as "Null", meaning no value is included for these settings in settings update table 600. In contrast, Capture Frequency has a specified value of 15 FPS and Capture Resolution has specified values of 1280 by 720. To update settings at a peripheral device, the setting update message which is transmitted by management server 410 at 414 to eventually be received at peripheral device 430 can include all of the settings shown in setting update table 600. Once received at the peripheral device 430, applying the settings update at 433 entails applying updates to only the settings for which values are specified. That is, where a setting value is "Null" or otherwise unspecified, the peripheral device can interpret this such that no change needs to be made to said setting.

The implementation of FIG. 6 advantageously reduces size of a setting update message, by avoiding transmission of detailed values of settings which are not changed.

FIG. 7 shows a settings update table 700 for a particular peripheral device. Settings update table 700 illustrates a subset of exemplary settings shown in FIG. 5, and description of these settings for FIG. 5 is applicable to FIG. 7 unless context dictates otherwise. Any settings could be specified in addition or instead of those shown, and/or some settings could be removed, as appropriate for a given application. Further, the "value" for each setting shown in FIG. 7 are merely exemplary; settings can be set at any value appropriate for a given application.

In FIG. 7, settings update table 700 includes entries only for settings which are changed or updated. In particular, the setting values for Access Point ID, Capture Frequency, Capture Resolution, Device Height, and Device Distance from Center are omitted from Settings update table 700, meaning neither these settings nor any value therefore is specified in settings update table 700. In contrast, Speaker Volume is included in settings update table 700 and has a specified value of 7. While a single setting is shown in the settings update table 700, additional settings could be included as appropriate for a given case. To update settings at a peripheral device, the setting update message which is transmitted by management server 410 at 414 to eventually be received at peripheral device 430 can include all of the settings shown in setting update table 700, and the associated values. Once received at the peripheral device 430, applying the settings update at 433 entails applying updates to only the settings specified in status update table 700. That is, where a setting is not specified, the peripheral device can interpret this such that no change needs to be made to said setting.

The implementation of FIG. 7 advantageously reduces size of a setting update message, by avoiding transmission of data for settings which are not changed.

Figures 8A, 8B:
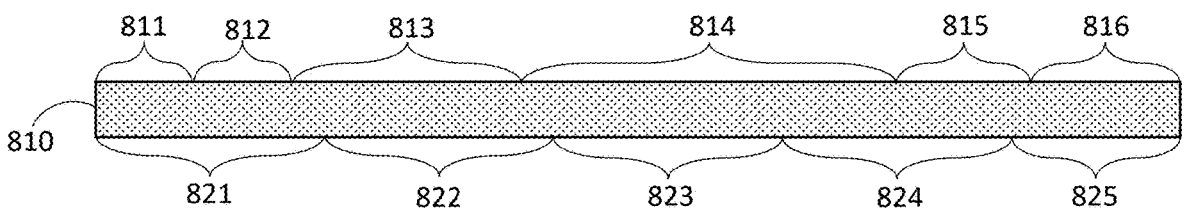
FIGS. 8A and 8B show respective implementations of messages split into a plurality of message segments.

FIGS. 8A and 8B shows exemplary divisions of a setting update message into a plurality of message segments. Such division or generation of message segments can be performed at a management server, e.g. as part of preparing a setting update message at 413 in method 400. This division or generation can be performed by any appropriate hardware, such as the at least one processor 312 in FIG. 3.

FIG. 8A shows a settings table 800 for a particular peripheral device, divided into a plurality of message segments. Settings table 800 illustrates the exemplary settings shown in FIG. 5, and description of these settings for FIG. 5 is applicable to FIG. 8A unless context dictates otherwise. Any settings could be specified in addition or instead of those shown, and/or some settings could be removed, as appropriate for a given application. Further, the "values" for each of the settings shown in FIG. 8A are merely exemplary; settings can be set at any value appropriate for a given application.

In FIG. 8A, settings table 800 is divided into three message segments: Message Segment 1, Message Segment 2, and Message Segment 3. Message Segment 1 includes setting values for Speaker Volume and Capture Frequency; Message Segment 2 includes setting values for Capture Resolution and Access Point ID; and Message Segment 3 includes setting values for Device Height and Device Distance from Center. The divisions between message segments in FIG. 8A are merely exemplary. Individual message segments can include any appropriate number of settings values. For example, one message segment could include only one setting value (for a setting with a value which occupies a larger amount of space), or two or more setting values (for settings with values which occupy smaller amounts of space). As another example, a message segment may include less than one setting value (e.g., a setting value may be spread across multiple message segments).

Dividing or parsing message segments according to settings as shown in FIG. 8A is optional. In some implementations, a setting update message is formatted as a string or sequence of data (e.g. a sequence of bytes), and the sequence of data is divided into message segments regardless of where particular settings in the message are specified. This is shown by way of example in FIG. 8B.

FIG. 8B shows a plurality of settings formatted as a sequence of data 810, divided into a plurality of message segments. In the example of FIG. 8B, setting 811 corresponds to Speaker Volume, setting 812 corresponds to Capture Frequency, setting 813 corresponds to Capture Resolution, setting 814 corresponds to Access Point ID, setting 815 corresponds to Device Height, and setting 816 corresponds to Device Distance from Center. Sequence of data 810 illustrates the exemplary settings shown in FIG. 5, and description of these settings for FIG. 5 is applicable to FIG. 8B unless context dictates otherwise. Any settings could be specified in addition or instead of those shown, and/or some settings could be removed, as appropriate for a given application.

Each of settings 811, 812, 813, 814, 815, and 816 is shown to be a certain amount of data in the sequence of data 810 (shown by the curly brace encompassing a corresponding region of data). The relative amounts of data (sizes) corresponding to each setting is merely illustrative, and settings can be formatted or structured to occupy different amounts of data, as appropriate for a given application. The data representing each setting can comprise, for example, the setting name, setting ID, the value, any header information which indicates a format or structure of the setting, or any other appropriate data.

FIG. 8B also illustrates the sequence of data 810 as divided into a plurality of message segments 821, 822, 823, 824, and 825. Message segments 821, 822, 823, 824, and 825 are shown as divisions of data 810, regardless of how the settings themselves are specified in the sequence of data

810. That is, boundaries between settings 811, 812, 813, 814, 815, and 816 represented by the data 810 do not necessarily align with boundaries between segments 821, 822, 823, 824, and 825 (though they could by coincidence in some cases). Some settings are larger than a single segment (e.g. setting 814), whereas other settings are smaller than a single segment (e.g. settings 811 and 812).

Message segments 821, 822, 823, and 824 are shown as being the same size (e.g. being the same quantity of data), and message segment 825 is shown as being smaller than each of message segments 821, 822, 823, and 824, because message segment 825 includes a remainder of data which isn't included in the other segments. For example, a maximum message size can be determined or set by the system. In some implementations any of the communication interfaces or communication formats can be subject to a message size cap. For example, communications between second communication module 326 and fourth communication module 336 could be restricted (e.g. to a maximum size of 2 bytes or 4 bytes per segment). This example restriction is merely illustrative, and a limitation can be dependent on a particular implementation, or could be decided as a convenient size to balance efficiency with risk of transmission failure should segments need to be retransmitted. Dividing a sequence of data into segments (e.g. in preparing a setting update message as in 413 of method 400) can comprise dividing the data into a sequence of message segments, where each message segment is a maximum allowable segment size, except for a final segment in the sequence which can be less than the maximum allowable segment size.

Message segments of a setting update message can be structured sequentially. In the example of FIG. 8A, Message Segments 1, 2 and 3 can be considered a sequence of message segments, where Message Segment 1 is the first message segment in the sequence, Message Segment 2 is the second message segment in the sequence, and Message Segment 3 is the third message segment in the sequence. In the example of FIG. 8B, message segments 821, 822, 823, 824, and 825 can be considered a sequence of message segments, in the order 821, 822, 823, 824 and 825. Such sequential structures can be applied regardless of how many message segments are in a setting update message.

Figure 9:
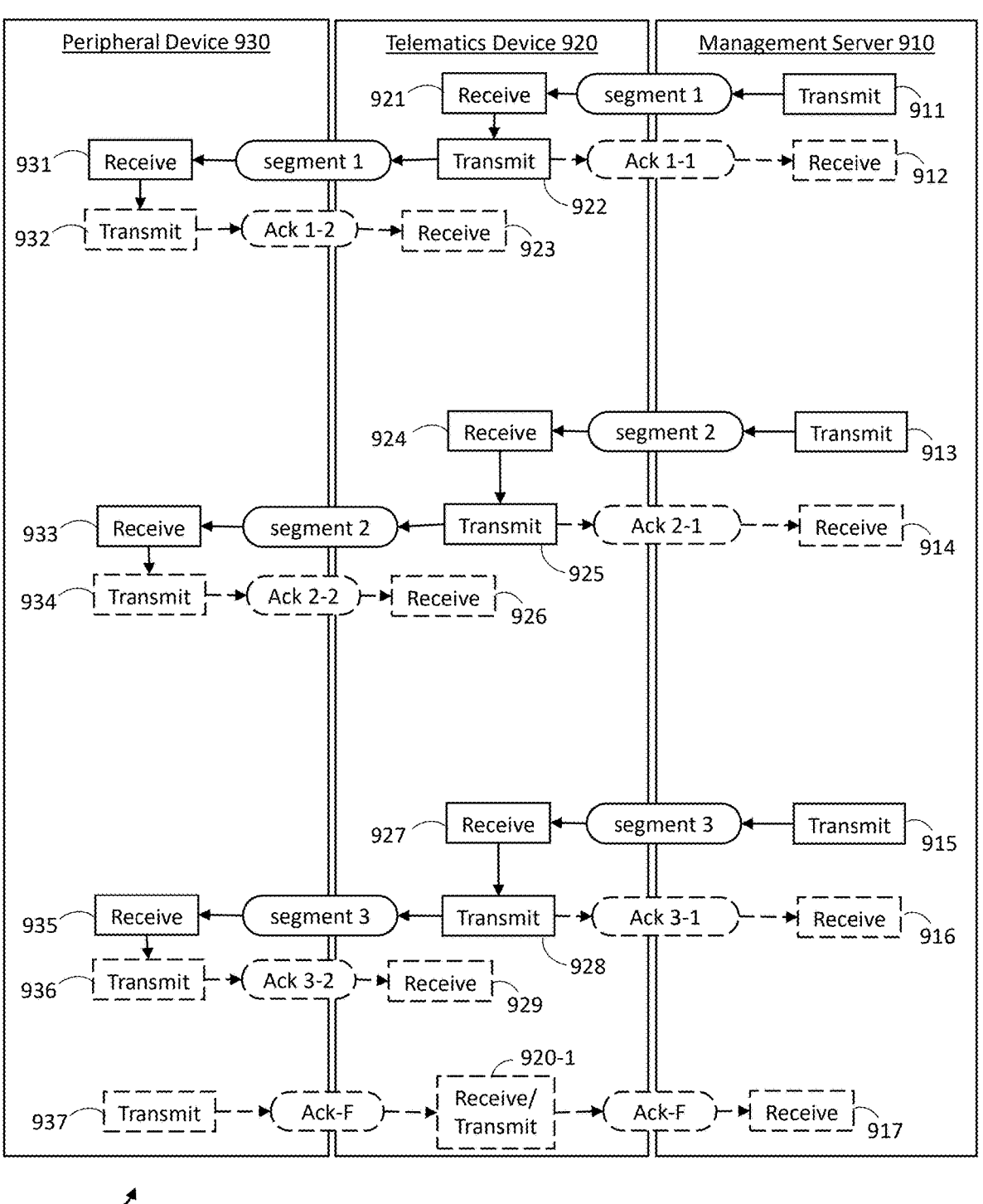
FIGS. 9, 10, and 11 are flowchart diagrams of methods for transmitting a plurality of message segments to a peripheral device.

FIG. 9 is a flowchart diagram which illustrates an exemplary method 900 for transmitting a setting update message which is split into message segments. Method 900 as illustrated includes acts performed by a management server 910 (illustrated as acts 911, 912, 913, 914, 915, 916, and 917), acts performed by a telematics device 920 (illustrated as acts 921, 922, 923, 924, 925, 926, 927, 928, 929, and 920-1), and acts performed by a peripheral device 930 (illustrated as acts 931, 932, 933, 934, 935, 936, and 937). One skilled in the art will appreciate that additional acts could be added, acts could be removed, or acts could be reordered as appropriate for a given application. Throughout the discussion of method 900, reference is made to elements of management server 310 which can be implemented as management server 910 in FIG. 9, to telematics device 320 which can be implemented as telematics device 920 in FIG. 9, and peripheral device 330 which can be implemented as peripheral device 930 in FIG. 9.

Method 900 can in a sense be considered as a detailed implementation of acts 414, 421, 423, 415, 431, and 424 of method 400 in FIG. 4. In this regard, discussion of method 400, and the hardware which can perform different acts of method 400, is also fully applicable to method 900 unless context dictates otherwise.

In the context of method 900, an exemplary transmission of a setting update message is shown which is split into three message segments "Message Segment 1", "Message Segment 2", and "Message Segment 3". Examples of message segments are discussed earlier with reference to FIGS. 8A and 8B. The principles of method 900 are fully applicable to cases where more or fewer message segments are included in the setting update message.

The acts of method 900 are shown generally in chronological sequence, from top to bottom. This sequence is not necessarily strict however, and in some cases certain acts which appear "sequentially" can be performed concurrently, as will be discussed later.

At 911, management server 910 transmits (e.g. by first communication module 316) Message Segment 1, which is received at 921 by telematics device 920 (e.g. by third communication module 328). At 922, telematics device 920 can optionally transmit (e.g. by third communication module 328) an acknowledgement "Ack 1-1" to be received at 912 by management server 910 (e.g. by first communication module 316), which is indicative of proper reception of Message Segment 1 by telematics device 920. If Message Segment 1 is not properly received at telematics device 920, act 911 is repeated.

As discussed earlier with reference to FIG. 4, and applicable for all of the acknowledgements discussed with reference to FIGS. 9, 10, and 11, such an acknowledgement can take different forms. In some implementations, an acknowledgement can explicitly indicate that a corresponding message segment was properly received, and a sending device can infer that the message segment was not properly received if the acknowledgement is not received. In other implementations, an acknowledgement can indicate that a corresponding message segment was not properly received, and a second device can infer that the message segment was properly received if the acknowledgement is not received. In yet other implementations, an acknowledgement can explicitly indicate either that a corresponding message segment was or was not properly received.

Also at 922, telematics device 920 transmits (e.g. by second communication module 326) Message Segment 1, which is received at 931 by peripheral device 930 (e.g. by fourth communication module 336). At 932, peripheral device 930 can optionally transmit (e.g. by fourth communication module 336) an acknowledgement "Ack 1-2" to be received at 923 by telematics device 920 (e.g. by second communication module 326), which is indicative of proper reception of Message Segment 1 by peripheral device 930. If Message Segment 1 was not properly received at peripheral device 930, transmission of Message Segment 1 at 922 is repeated. As discussed above regarding Ack 1-1 and not repeated for brevity, such an acknowledgement can take different forms.

At 913, management server 910 transmits (e.g. by first communication module 316) Message Segment 2, which is received at 924 by telematics device 920 (e.g. by third communication module 328). At 925, telematics device 920 can optionally transmit (e.g. by third communication module 328) an acknowledgement "Ack 2-1" to be received at 914 by management server 910 (e.g. by first communication module 316), which is indicative of proper reception of Message Segment 2 by telematics device 920. If Message Segment 2 was not properly received at telematics device 920, act 913 is repeated. As discussed above regarding Ack 1-1 and not repeated for brevity, such an acknowledgement can take different forms.

Also at 925, telematics device 920 transmits (e.g. by second communication module 326) Message Segment 2, which is received at 933 by peripheral device 930 (e.g. by fourth communication module 336). At 934, peripheral device 930 can optionally transmit (e.g. by fourth communication module 336) an acknowledgement "Ack 2-2" to be received at 926 by telematics device 920 (e.g. by second communication module 326), which is indicative of proper reception of Message Segment 2 by peripheral device 930. If Message Segment 2 was not properly received at peripheral device 930, transmission of Message Segment 2 at 925 is repeated.

At 915, management server 910 transmits (e.g. by first communication module 316) Message Segment 3, which is received at 927 by telematics device 920 (e.g. by third communication module 328). At 928, telematics device 920 can optionally transmit (e.g. by third communication module 328) an acknowledgement "Ack 3-1" to be received at 916 by management server 910 (e.g. by first communication module 316), which is indicative of proper reception of Message Segment 3 by telematics device 920. If Message Segment 3 was not properly received at telematics device 920, act 915 is repeated. As discussed above regarding Ack 1-1 and not repeated for brevity, such an acknowledgement can take different forms.

Also at 928, telematics device 920 transmits (e.g. by second communication module 326) Message Segment 3, which is received at 935 by peripheral device 930 (e.g. by fourth communication module 336). At 936, peripheral device 930 can optionally transmit (e.g. by fourth communication module 336) an acknowledgement "Ack 3-2" to be received at 929 by telematics device 920 (e.g. by second communication module 326), which is indicative of proper reception of Message Segment 3 by peripheral device 930. If Message Segment 3 was not properly received at peripheral device 930, transmission of Message Segment 2 at 928 is repeated.

FIG. 9 illustrates several optional acts of transmitting individual acknowledgements per message segment (namely acts 912, 923, 932, 914, 926, 934, 916, 929, 936). However, in some implementations these individual acknowledgements (Ack 1-1, Ack 1-2, Ack 2-1, Ack 2-2, Ack 3-1, and Ack 3-2) can be omitted. Instead, in some implementations, multiple such acknowledgements can be grouped together as an acknowledgement of reception of the setting update message as a whole (or of successful application of settings specified in the setting update message as a whole). This is shown by way of example in FIG. 9 at 937, where the peripheral device 930 transmits an Ack-F to eventually be received at management server 910 at 917. In some implementations, Ack-F is transmitted via telematics device 920 as shown at 920-1 (e.g. from the fourth communication module 336 of the peripheral device, to the second communication module 326 of the telematics device, and from the third communication module 328 of the telematics device to the first communication module 316 of the management server). In other implementations, Ack-F is transmitted without passing through telematics device 920 (e.g. from the fifth communication module 338 of the peripheral device, to the first communication module 316 of the management server). If any of the message segments were not properly received at peripheral device 930, transmission of the corresponding message segments can be repeated, or transmission of all message segments (the entirety of method 900) can be repeated. In some implementations, transmission of Ack-F can occur in addition to (instead of in-lieu of) transmission of per-segment acknowledgements (Acks 1-1, 1-2, 2-1, 2-2, 3-1, and 3-2).

In FIG. 9, at each of 922, 925, and 928, transmission of a respective acknowledgement to management server 910 is shown as being concurrent with transmission of a respective message segment to peripheral device 930. This is not necessarily the case however. In some implementations, transmission of the respective acknowledgement can be performed prior to transmission of the respective message segment. In other implementations, transmission of the respective message segment can be performed prior to transmission of the respective acknowledgement. In some implementations, transmission of the respective acknowledgement and transmission of the respective message segment can be initiated at different moments in time, but with some overlap in time.

In the example method 900 in FIG. 9, transmitting a plurality of message segments in sequence comprises transmitting each message segment by the management server 910 (via the first communication module 316) to the peripheral device 920 (via third communication module 328). In response to receiving each message segment, a respective acknowledgement is optionally transmitted from the peripheral device 920 (via the third communication module 328) to the management server 910 (via the first communication module 316). Where the acknowledgement indicates proper reception of the message segment, if improper reception occurs (if no acknowledgement is sent), method 900 returns to transmit the plurality of message segments in sequence, starting from a sequentially first message segment for which an acknowledgement was not received at the management server 910. In the example of FIG. 9, if Ack 1-1 is not received at the management server 910, method 900 repeats act 911 and onwards; if Ack 2-1 is not received at the management server 910, method 900 repeats act 913 and onwards; and if Ack 3-1 is not received at the management server 910, method 900 repeats act 915 and onwards. In this way, if communication between management server 910 and telematics device is interrupted (e.g. if a communication network becomes inaccessible, or if telematics device 920 powers down, as non-limiting examples.

FIG. 9 illustrates an example scenario where the plurality of message segments are transmitted sequentially. But in some cases a user input may be received to update certain settings during transmission of the plurality of message segments. FIGS. 10 and 11 discussed below address such a scenario.

Figure 10:
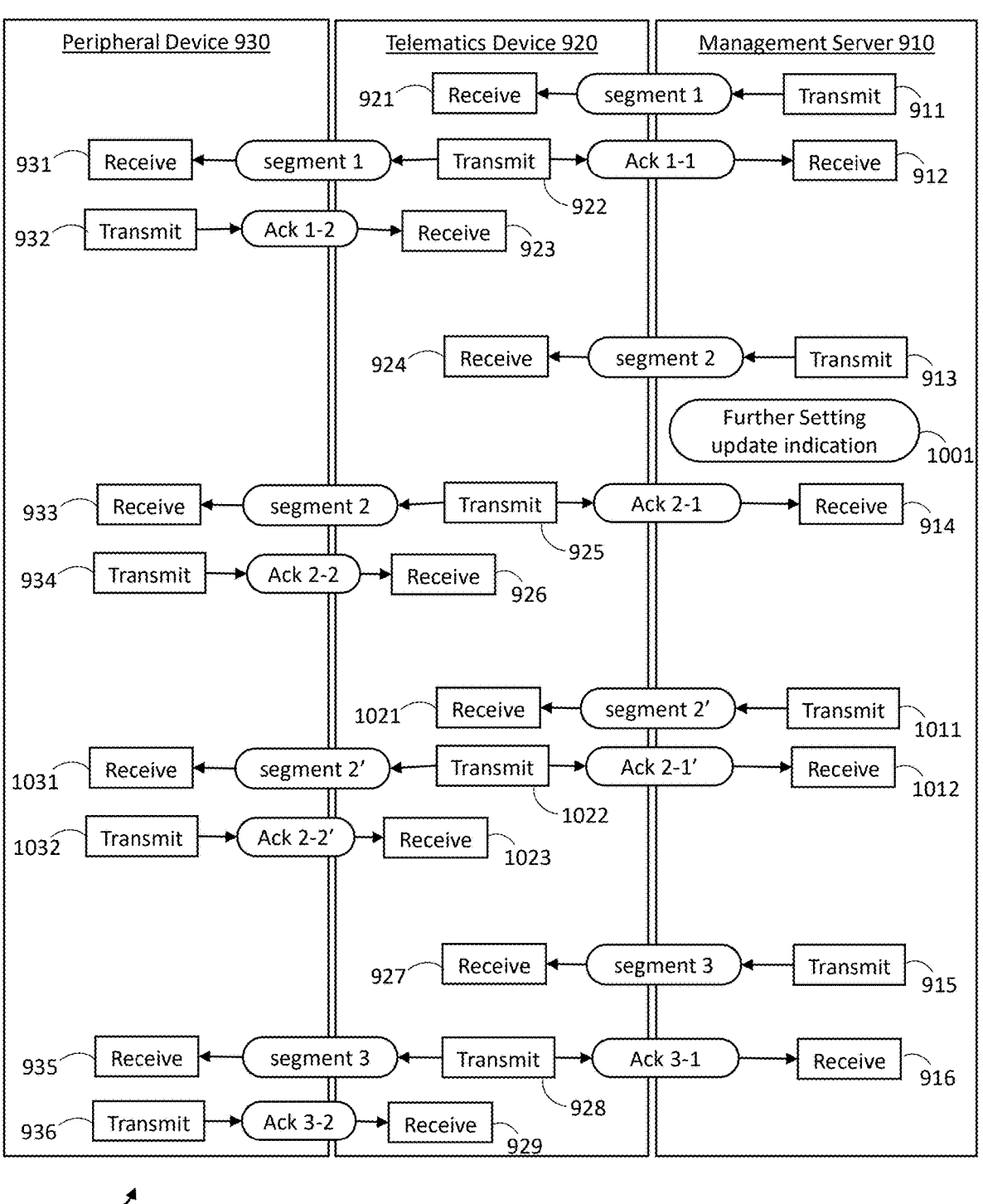

FIG. 10 is a flowchart diagram which illustrates an exemplary method 1000 for transmitting a setting update message which is split into message segments. Method 1000 in similar in at least some respective to method 900 discussed with reference to FIG. 9. In particular, method 1000 includes acts from method 900 including acts performed by a management server 910 (illustrated as acts 911, 912, 913, 914, 915, and 916), acts performed by a telematics device 920 (illustrated as acts 921, 922, 923, 924, 925, 926, 927, 928, and 929), and acts performed by a peripheral device 930 (illustrated as acts 931, 932, 933, 934, 935, and 936). Description of these acts with reference to method 900 in FIG. 9 is also applicable to method 1000 in FIG. 10, and is not repeated for brevity. Method 1000 also includes acts 1001, 1011, and 1012 performed by management server 910, acts 1021, 1022, and 1023 performed by telematics device 920, and acts 1031 and 1032 performed by peripheral device 930. One skilled in the art will appreciate that additional acts could be added, acts could be removed, or acts could be reordered as appropriate for a given application.

One difference between method 1000 and method 900 is that in method 1000, a further setting update indication is received at 1001 (e.g. via user input, similar to the indication of setting update at 440 in FIG. 4). The further setting update indication is received during transmission of the setting update message, and in the illustrated example, the further setting update indication is received during transmission of the Message Segment 2 at 913. In the example, the further setting update is indicative of a setting update to be applied to at least one setting which is included in Message Segment 2. In the particular example of FIG. 8A, the further setting update could be indicative of an update to Capture Resolution or Access Point ID.

At 1011, management server 910 transmits (e.g. by first communication module 316) Message Segment 2', which is received at 1021 by telematics device 920 (e.g. by third communication module 328). Message Segment 2' is a message segment akin to Message Segment 2, but incorporates the further setting update as received at 1001. That is, the setting update message (or the plurality of message segments) as a whole is updated to include a further Message Segment 2', which specifies at least one setting update to apply at the peripheral device based on the further user input received at 1001. At least one processor of the management server (e.g. the at least one processor 312) can prepare Message Segment 2' to be of similar format to Message Segment 2 (e.g. includes the same settings), but updated to reflect updates to setting values specified in the further setting update indication.

At 1022, telematics device 920 can transmit (e.g. by third communication module 328) an acknowledgement "Ack 2-1'" to be received at 1012 by management server 910 (e.g. by first communication module 316), which is indicative of proper reception of Message Segment 2' by telematics device 920. If Message Segment 2' was not properly received at telematics device 920, act 1011 is repeated. As discussed above regarding Ack 1-1 and not repeated for brevity, such an acknowledgement can take different forms.

Also at 1022, telematics device 920 transmits (e.g. by second communication module 326) Message Segment 2', which is received at 1031 by peripheral device 930 (e.g. by fourth communication module 336). At 1032, peripheral device 930 can transmit (e.g. by fourth communication module 336) an acknowledgement "Ack 2-2'" to be received at 1023 by telematics device 920 (e.g. by second communication module 326), which is indicative of proper reception of Message Segment 2' by peripheral device 930. If Message Segment 2' was not properly received at peripheral device 930, transmission of Message Segment 2' at 1022 is repeated.

In method 1000, after communication of Message Segment 2' from management server 910, communication of Message Segment 3 can commence beginning at 915 as discussed with reference to FIG. 9.

In the example of method 1000 in FIG. 10, the further message segment (Message Segment 2') is inserted into the setting update message (into the plurality of message segments) immediately sequential to a particular message segment (Message Segment 2) which includes changes to at least one particular setting updated in the further setting update as indicated in the further user input received at 1001. In the exemplary implementation, transmission of the further message segment (Message Segment 2') occurs after an acknowledgement (Ack 2-1) is received at the management server 910 from the telematics device 920 at 925 and 914.

In implementations where the entire plurality of message segments (the whole setting update message) is received at the peripheral device prior to applying the setting update, at least one processor of the peripheral device (e.g. the at least one processor 332) can format the setting update message (as in act 432 of method 400), to assemble the whole setting update message. In this process, the settings specified in Message Segment 2 can be replaced with the settings specified in Message Segment 2', resulting in a cohesive setting update to apply at act 433. Alternatively, the original setting update message, including original Message Segment 2, can be assembled and applied, then a separate setting update can be applied afterwards to apply the further setting update specified in Message Segment 2'.

Figure 11:
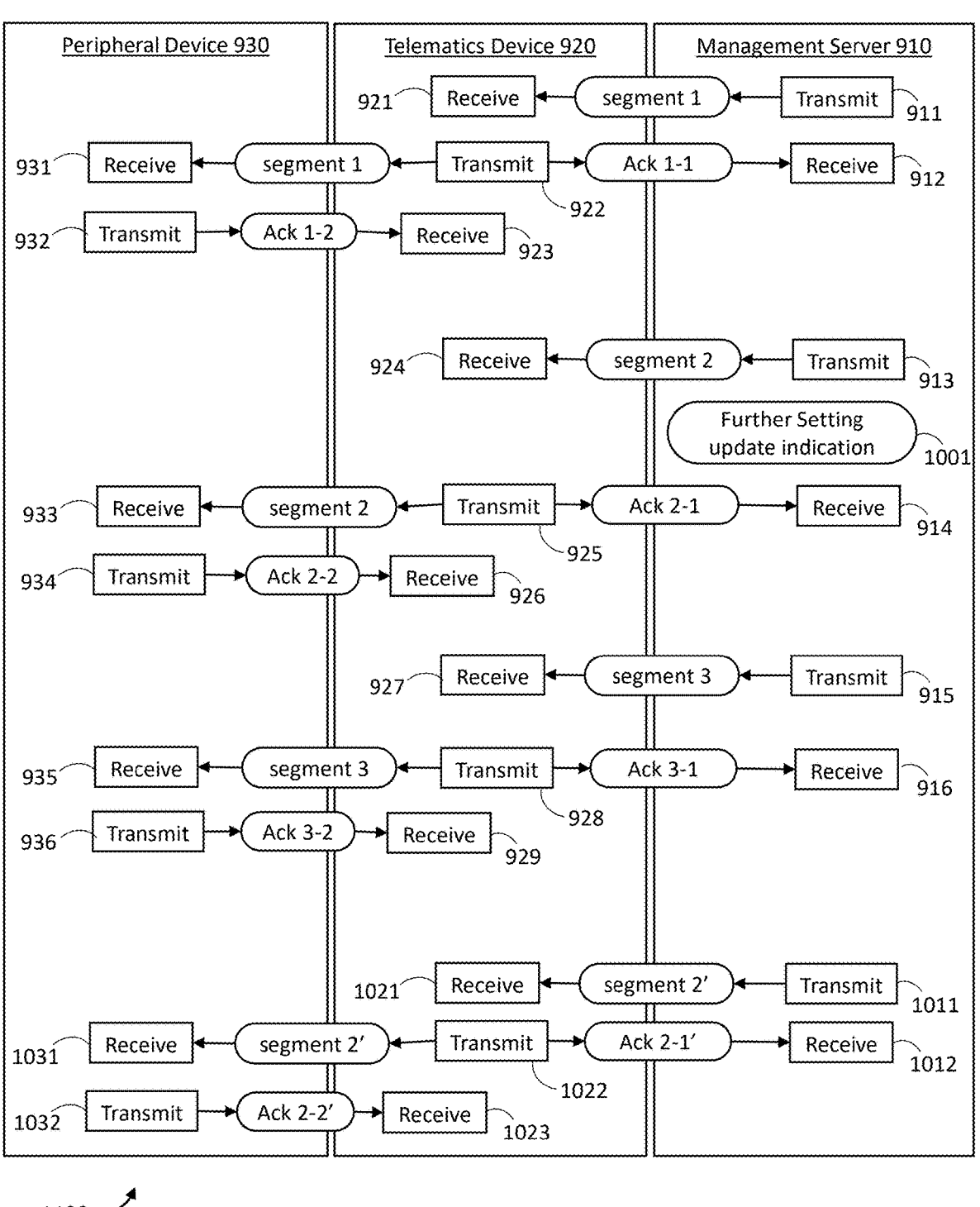

FIG. 11 is a flowchart diagram which illustrates an exemplary method 1100 for transmitting a setting update message which is split into message segments. Method 1100 is similar in at least some respective to method 900 discussed with reference to FIG. 9 and method 1000 discussed with reference to FIG. 10. In particular, method 1100 includes acts from method 900 including acts performed by a management server 910 (illustrated as acts 911, 912, 913, 914, 915, and 916), acts performed by a telematics device 920 (illustrated as acts 921, 922, 923, 924, 925, 926, 927, 928, and 929), and acts performed by a peripheral device 930 (illustrated as acts 931, 932, 933, 934, 935, and 936). Description of these acts with reference to method 900 in FIG. 9 is also applicable to method 1100 in FIG. 11, and is not repeated for brevity. Method 1100 also includes acts of method 1000, including acts 1001, 1011, and 1012 performed by management server 910, acts 1021, 1022, and 1023 performed by telematics device 920, and acts 1031 and 1032 performed by peripheral device 930. Description of these acts with reference to method 1000 in FIG. 10 is also applicable to method 1100 in FIG. 11, and is not repeated for brevity. One skilled in the art will appreciate that additional acts could be added, acts could be removed, or acts could be reordered as appropriate for a given application.

One difference between method 1100 and method 1000 is that in method 1100, timing for communication of a further setting update is different.

In method 1100, similarly to as in method 1000, a further setting update indication is received at 1001 (e.g. via user input, similar to the indication of setting update at 440 in FIG. 4). The further setting update indication is received during transmission of the setting update message, and in the illustrated example, the further setting update indication is received during transmission of the Message Segment 2 at 913. In the example, the further setting update is indicative of a setting update to be applied to at least one setting which is included in Message Segment 2. In the particular example of FIG. 8A, the further setting update could be indicative of an update to Capture Resolution or Access Point ID.

In acts 1011, 1012, 1021, 1022, 1023, 1031, and 1032, a Message Segment 2' is communicated from management server 910 to peripheral device 930, similarly to as described with reference to FIG. 10, and not repeated for brevity. Message Segment 2' is a message segment akin to Message Segment 2, but incorporates the further setting update as received at 1001. At least one processor of the management server (e.g. the at least one processor 312) can prepare Message Segment 2' to be of similar format to Message Segment 2 (e.g. includes the same settings), but updated to reflect updates to setting values specified in the further setting update indication.

In the example of method 1100 in FIG. 11, the further message segment (Message Segment 2') is inserted into the setting update message (into the plurality of message segments) after all of the message segments in the original setting update message (the original plurality of message segments). In the exemplary implementation, transmission of the further message segment (Message Segment 2') occurs after an acknowledgement (Ack 1-1, Ack 2-1, and Ack 3-1) is received at the management server 910 from the telematics device 920 for each message segment initially included in the setting update message (Message Segments 1, 2, and 3 in the example).

As discussed with reference to FIG. 10, in some implementations at least one processor of the peripheral device (e.g. the at least one processor 332) can format the setting update message (as in act 432 of method 400), to assemble the whole setting update message. In this process, the settings specified in Message Segment 2 can be replaced with the settings specified in Message Segment 2', resulting in a cohesive setting update to apply at act 433. Alternatively, the original setting update message, including original Message Segment 2, can be applied, then a separate setting update can be applied afterwards to apply the further setting update specified in Message Segment 2'.

In some cases, modifying message segments individually can be risky, and can lead to errors, such as forcing Peripheral Device 930 into an unexpected state, because there can be inconsistencies in the applied update. As such, in some implementations, it is preferable to finish receiving and applying one setting update before receiving and applying a further status update. Examples are discussed below, as well as later with reference to FIGS. 13, 14, 15, 16, 17, 18, 19, and 20.

In an exemplary implementation, if a further setting update is received from a user during transmission of the setting update message (or during any part of method 400 in FIG. 4), method 400 can first finish, such that settings specified in an original setting update are first communicated to and applied at the peripheral device. Method 400 can subsequently be repeated to send another setting update message including the further setting update. That is, each of the acts of method 400 can be repeated to transmit a further setting update message from management server 410 to peripheral device 430 via telematics device 420, and apply at least one further setting specified in the further setting update message at the peripheral device 430. The description of method 400 is fully applicable to transmission of this further setting update message. This way issues of inconsistency in settings are reduced, but setting update times may be increased.

Figure 12:
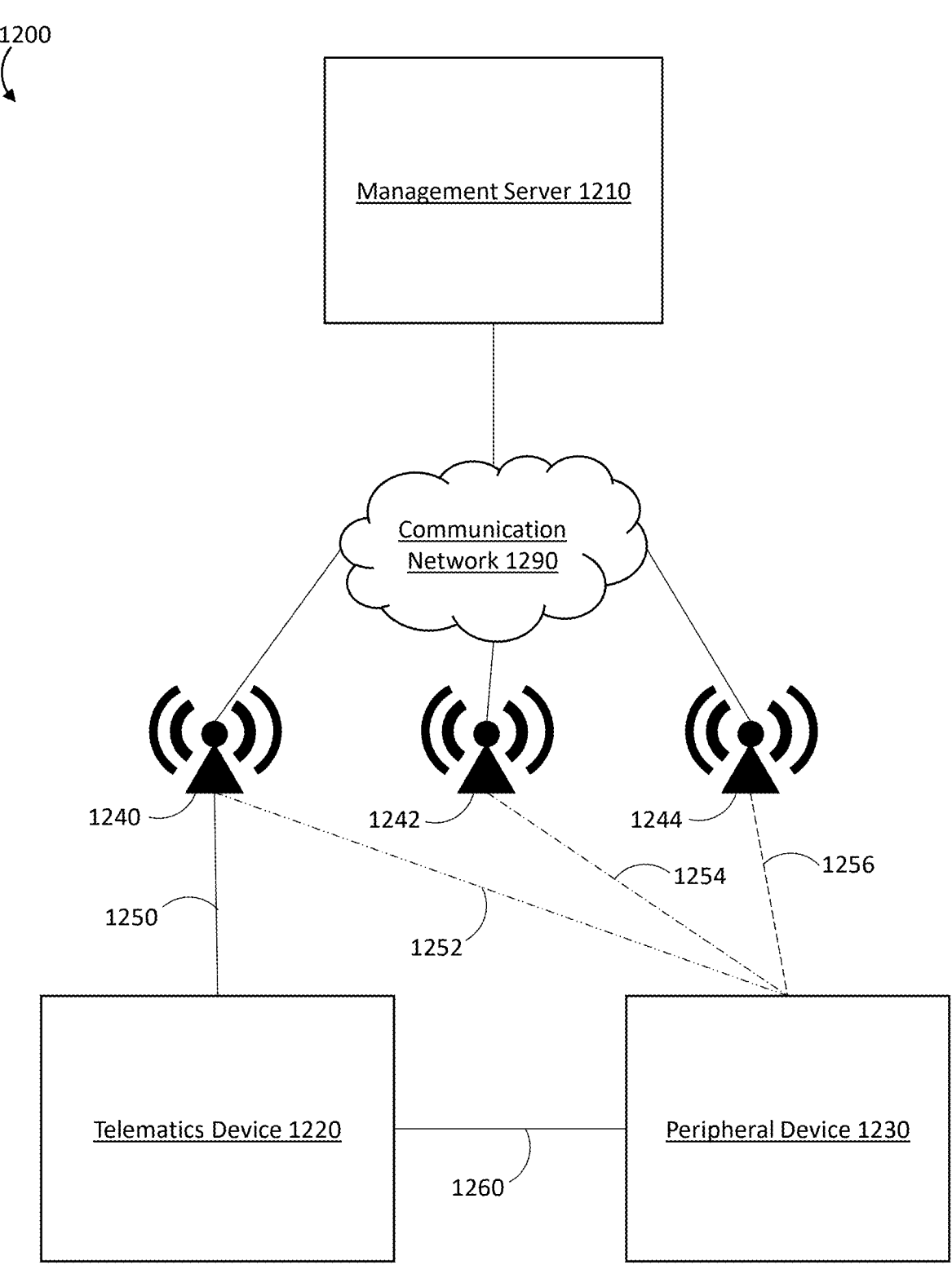
FIG. 12 is a schematic view of a system of devices which communicate with each other, in accordance with at least one illustrated example.

FIG. 12 is a schematic diagram showing a system 1200 including a management server 1210, a telematics device 1220, a peripheral device 1230, and a communication network 1290. The hardware shown in FIG. 12 is not exhaustive, and any appropriate hardware can be included in each of the devices. In particular, description of hardware with reference to FIG. 3 is also applicable to FIG. 12, such that description of management server 310 is applicable to management server 1210, description of telematics device 320 is applicable to telematics device 1220, description of peripheral device 330 is applicable to peripheral device 1230, and description of communication network 390 is applicable to communication network 1290.

FIG. 12 also shows a plurality of access points 1240, 1242, and 1244. Access points can be any appropriate hardware or device by which telematics device 1220 and peripheral device 1230 connect to communication network 1290. Access points 1240, 1242, and 1244 could for example be cellular communication towers or base stations, short range wireless network (e.g. WiFi®) routers, or satellite dishes, as non-limiting examples.

As discussed with reference to FIG. 3, in some optional implementations peripheral devices herein can include wireless communication hardware (e.g. communication module 338). As discussed earlier with reference to FIG. 5, one of the settings which can be available for a peripheral device is Access Point ID. In this regard, a peripheral device can utilize its wireless communication hardware to connect to an access point, which can be specified by a setting at the peripheral device. Methods 400, 900, 1000, and 1100 discussed earlier provide a way to change what access point a peripheral device connects to (by sending a setting update message to change the access point ID).

In methods 400, 900, 1000, and 1100, setting updates are communicated to a peripheral device indirectly via a telematics device. In FIG. 3, the telematics device 320 and peripheral device 330 communicate with each other via second communication module 326 and fourth communication modules 336. This is also shown in FIG. 12 as communication pathway 1260. In FIG. 3, the telematics device 320 communicates with communication network 390 via third communication module 328, which is shown in FIG. 12 as communication pathway 1250. In particular, in FIG. 12 telematics device 1220 communicates with communication network 1290 (and in turn management server 1210) via access point 1240 through communication pathway 1250. In FIG. 3, the peripheral device 330 communicates with communication network 390 via fifth communication module 338, which is shown in FIG. 12 as any one of communication pathways 1252, 1254, and 1256. In particular, in FIG. 12 peripheral device 1230 communicates with communication network 1290 (and in turn management server 1210) via access point 1240 through communication pathway 1252, access point 1242 through communication pathway 1254, or access point 1244 through communication pathway 1256.

If one were to communicate a setting update to an access point ID setting at peripheral device 1230, by directly communicating with the peripheral device via any of access points 1240, 1242, or 1244, this would first require that the peripheral device be connected to one of said access points, and the setting update would also interrupt said communication. Thus, such an implementation is limited in application (e.g. it could not update an erroneous access point ID setting which prevents the peripheral device 1230 from connecting to an access point), and may also cause errors in applying the access point ID setting update because it relies on a communication pathway which is subject to change.

In an exemplary scenario, settings at peripheral device 1230 can be such that peripheral device 1230 is set to use its fifth communication module (e.g. 338 in FIG. 3) to communicate with a particular access point (access point 1244 via communication pathway 1256 in this example). However, for any number of reasons communication with access point 1244 may not be possible at a given time (e.g. access point 1244 could be out of service, overloaded, or otherwise not available), or may not be desired (e.g. bandwidth costs with access point 1244 may be undesirably high). To address this, a setting update message can be communicated to peripheral device 1230 via telematics device 1220, in accordance with method 400. The setting update message can include instructions to update an access point ID setting at the peripheral device 1230, such that the peripheral device closes communication (or attempted communication) with access point 1244, and opens communication with a different access point specified in the setting update (e.g. either of access points 1242 or 1240).

Access point ID settings are not necessarily a directive to communicate via any particular access point, but may rather be a hierarchy or priority of which to attempt communication. For example, access point ID settings could specify preferred access points or sets of access points which belong to an entity which offers preferred pricing or greater bandwidth availability, as a non-limiting example.

Figure 13:
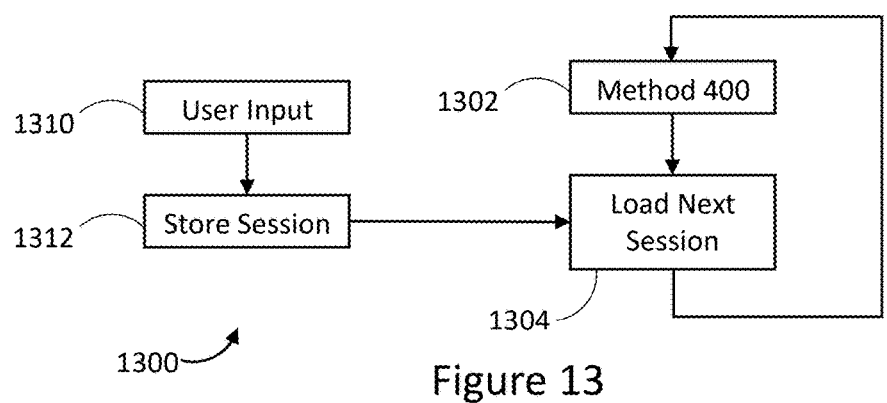
FIG. 13 is a flowchart diagram of a method for managing sessions of setting updates for a peripheral device.

FIG. 13 is a flowchart diagram which illustrates an exemplary method 1300 for transmitting a plurality of setting updates across a plurality of message sessions. Method 1300 as illustrated includes acts performed by a management server (such as management server 310 in FIG. 3 or management server 410 in FIG. 4). FIG. 13 as illustrated includes acts 1302, 1304, 1310, and 1312, though one skilled in the art will appreciate that additional acts could be added, acts could be removed, or acts could be reordered as appropriate for a given application.

At 1302, method 400 is performed. In particular, user input indicative of a setting update is received per act 411. The setting update is stored per act 412. In the context of method 1300, act 412 includes storing a first update "session", the first update session specifying at least one setting to apply at the peripheral device based on the user input indicative of the setting update as received at 411. Preparing the setting update message at 413 comprises accessing the first update session, and generating the setting update message to specify the at least one setting specified in the first update session. That is, the setting update message 413 is based on the first update session as stored at the management server (e.g. at the at least one non-transitory processor-readable storage medium 314). Method 400 continues in the context of FIG. 13, such that the setting update is applied at 433.

Generally, an "update session" as referred to herein refers to a batch of one or more settings which are to be applied at the peripheral device, where said batches are applied at separate times. In particular, one update session is applied at the peripheral device prior to applying a next update session, as discussed below. Update sessions are discussed in detail later with reference to FIGS. 15, 16, 17, 18, 19, and 20.

In method 1300, after method 400 is performed at 1302 (after the first update session is applied at the peripheral device), method 1300 proceeds to act 1304. For example, act 1304 can be triggered after the first setting update is confirmed to be applied, as indicated (expressly or implicitly) by an acknowledgement transmitted from the peripheral device to the management server (as in acts 434 and 424 of method 400). At 1304, a next update session is loaded/accessed from storage at the management device, as discussed below.

At 1310, a further user input indicative of a further setting update for the peripheral device is received at the management server. Act 1310 occurs before completion of method 400 at 1302; that is act 1310 occurs before completion of applying the at least one setting specified in the setting update message at 433, or before confirming that the at least one setting has been applied as indicated (expressly or implicitly) by an acknowledgement transmitted from the peripheral device to the management server (as in acts 434 and 424 of method 400).

Instead of immediately transmitting or applying an update specified in the further user input, at 1312, a further (second) update session is stored at the management server (e.g. at the at least one non-transitory processor-readable storage medium 314). In this regard, the further update session is "queued", to be applied after the previous (first) update session is successfully applied. This prevents the peripheral device entering into unexpected states or having errors due to inconsistent settings.

At 1304, after completion of applying the at least one setting specified in the setting update at 433 (the first session), the next session (the second session discussed above) is loaded (accessed). Method 400 is then repeated for the second session. Loading or accessing the second session can take the place of act 411 in method 400 in the context of 1302 in method 1300. That is, the indication of the further setting update is specified in the second update session. At 413, the at least one processor of the management server prepares a second setting update message, based on the accessed second update session. In particular, the second setting update message is generated to specify the at least one setting to be updated at the peripheral device as specified in the second update session.

Method 400 is then completed a second time, whereby the second setting update message is transmitted from the management server, to eventually arrive at the peripheral device where the second setting update is applied.

In some cases, multiple user inputs can be received at 1310 (or alternatively, act 1310 can occur multiple times, once for each user input). At 1312, the multiple user inputs can be stored. In some implementations, each user input can be stored as a respective update session. Such implementations are discussed later with reference to FIGS. 15, 16, and 17. In other implementations, a pending update session which has not yet been loaded at 1304 can be revised to include setting changes indicated in additional user inputs received at 1310. Such implementations are discussed later with reference to FIGS. 18, 19, and 20.

FIG. 14 illustrates an exemplary user interface 1400, by which user inputs can be received (e.g. at 411 in method 400 and/or 1310 in method 1300). User interface 1400 includes a settings input window 1410, a reset button 1412, and a save button 1414. User interface 1400 is merely exemplary, and any other user interface could be utilized as appropriate for a given application. Further, user interface 1400 can be modified as appropriate to include fewer or more windows, buttons, or other presentation or interaction elements.

In the example of FIG. 14, settings window 1410 includes the settings discussed above with reference to FIG. 5, but could include fewer, more, or different settings as appropriate for a given application. In FIG. 14, "Setting ID" is not displayed, because such an ID is generally not as easy to understand for a user as the Setting Name; however Setting ID could be displayed, as appropriate. Settings window 1410 also shows distinct "value" and "new value" columns, indicating a currently set value of a setting and a place for the user to input a new or changed value of the setting. In some implementations, the new value column can be omitted, and the user may make changes directly in the "Value" column.

The optional Reset button 1412 provides a mechanism for the user to quickly reset all unsaved changes to settings (changes shown in the New Value column) to the presently set values.

The Save button 1414 causes the updated settings (the setting values in the New Values column) to be saved, triggering an update procedure (e.g. as in methods 400 and 1300) for settings at the peripheral device. In an example with reference to FIGS. 4 and 13, the Save button cause the New Value settings to the received as in act 411 of method 400 (if there are no pending update sessions), or to be received and stored as in acts 1310 and 1312 of method 1300 (if a setting update is already in progress).

While user interface 1400 is discussed in combination with method 1300, user interface 1400 is applicable to any case herein where user input regarding settings is received, and does not strictly require the use of Update Sessions as discussed with reference to FIG. 13.

Exemplary implementations are discussed below, where a setting update is in progress as in act 1302 of method 1300.

In a first exemplary implementation, a respective update session is stored for each user input indicating at least one setting update. In this implementation, a user input indicating at least one setting update corresponds to one click of the Save button 1414 where at least one setting has been changed. A user may make changes to a single setting, or to multiple settings, and clicks the Save button 1414; this corresponds to one user input indicating at least one setting update.

In this example, the user makes changes to Speaker Volume (to 6), Capture Frequency (to 20 FPS), and Capture Resolution (to 1920×1080), and clicks the Save button 1414. Update Session 1 shown in FIG. 15 is saved (stored), per act 1312 in method 1300, which reflects these changes to Speaker Volume, Capture Frequency, and Capture Resolution. Subsequent this first click of Save button 1414, the user makes an additional setting change. In the particular example, the user makes a change in of Access Point ID to "Y" and clicks Save button 1414. Update Session 2 shown in FIG. 16 is saved (stored), per act 1312 in method 1300, which reflects this change in Access Point ID. Subsequent this second click of Save button 1414, the user makes additional setting changes. In the particular example, the user makes further changes to Capture Frequency (to 30 FPS) and Capture Resolution (to 2560×1440) and clicks Save button 1414. Update Session 3 shown in FIG. 17 is saved (stored), per act 1312 in method 1300, which reflects these changes to Capture Frequency and Capture Resolution.

In the above example, Three update sessions are stored, which are applied in sequence in the context of method 1300. In particular, once application of a current setting update is completed, Update Session 1 will be loaded at 1304 and applied per method 400 at 1302; once application of Update Session 1 is completed, Update Session 2 will be loaded at 1304 and applied per method 400 at 1302; and once application of Update Session 2 is completed, Update Session 3 will be loaded at 1304 and applied per method 400 at 1302. In this example, by parsing setting changes in respective sessions, improper operation of the peripheral device or other errors due to unexpected setting behavior is avoided, because the sequence of setting changes is stored and applied with consistency. However, this can result in redundant or unnecessary setting updates. For example, Capture Frequency and Capture Resolution are changed per Update Session 1, then changed shortly thereafter per Update Session 3.

While FIGS. 15, 16, and 17 illustrate three update sessions, any number of update sessions can occur or be saved on a per-implementation or per-scenario basis. For example, a user could make fewer or more changes prior to a next update session being accessed at 1304.

In a second exemplary implementation shown in FIGS. 18, 19, and 20, a single Pending Update Session is stored and updated for each user input indicating at least one setting update.

In this second exemplary implementation, a user input indicating at least one setting update corresponds to one click of the Save button 1414 where at least one setting has been changed. A user may make changes to a single setting, or to multiple settings, and click the Save button 1414; this corresponds to one user input indicating at least one setting update.

In this example, the user makes changes to Speaker Volume (to 6), Capture Frequency (to 20 FPS), and Capture Resolution (to 1920×1080) as shown in FIG. 14, and clicks the Save button 1414. A Pending Update Session is saved (stored), per act 1312 in method 1300, which reflects these changes to Speaker Volume, Capture Frequency, and Capture Resolution. In this example, Pending Update Session (Time 1) shown in FIG. 18 is a first state of the Pending Update Session.

Subsequent the first click of Save button 1414, the user makes an additional setting change. In the particular example, the user makes a change in of Access Point ID to "Y" and clicks Save button 1414. The Pending Update Session is updated and saved (stored), per act 1312 in method 1300, to reflect this change in Access Point ID. In this example, Pending Update Session (Time 2) shown in FIG. 19 is a second state of the Pending Update Session, updated to include the change to Access Point ID.

Subsequent this second click of Save button 1414, the user makes additional setting changes. In the particular example, the user makes further changes to Capture Frequency (to 30 FPS) and Capture Resolution (to 2560×1440) and clicks Save button 1414. The Pending Update Session is updated and saved (stored), per act 1312 in method 1300, to reflect these changes to Capture Frequency and Capture Resolution. In this example, Pending Update Session (Time 3) shown in FIG. 20 is a third state of the Pending Update Session, updated to include the subsequent changes of Capture Frequency (to 30 FPS) and Capture Resolution (to 2560×1440), instead of the initial changes (20 FPS and 1920×1080) as shown in FIG. 18. Pending Update Session (Time 3) in FIG. 20 also includes the change to Access Point ID as previously established with reference to FIG. 19.

In the above example, one Pending Update Session is stored, which is applied in the context of method 1300. In the particular example, once application of a current setting update is completed, the Pending Update Session (Time 3) as shown in FIG. 20 will be loaded at 1304 and applied per method 400 at 1302. In this example, by parsing setting changes in a single Pending Update Session, redundant or unnecessary setting updates can be prevented.

While FIGS. 18, 19, and 20 illustrates three stages of a pending update session, any number of stages can occur on a per-implementation or per-scenario basis. For example, a user could make fewer or more changes prior to the pending update session being accessed at 1304.

In any of the examples where setting updates are divided amongst update sessions, setting update messages sent for any given session can also be divided into segments, as discussed with reference to FIGS. 8, 9, 10, and 11.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

Throughout this specification and the appended claims, infinitive verb forms are often used, such as "to operate" or "to couple". Unless context dictates otherwise, such infinitive verb forms are used in an open and inclusive manner, such as "to at least operate" or "to at least couple".

The Drawings are not necessarily to scale and may be illustrated by phantom lines, diagrammatic representations, and fragmentary views. In certain instances, details that are not necessary for an understanding of the exemplary embodiments or that render other details difficult to perceive may have been omitted.

The specification includes various implementations in the form of block diagrams, schematics, and flowcharts. A person of skill in the art will appreciate that any function or operation within such block diagrams, schematics, and flowcharts can be implemented by a wide range of hardware, software, firmware, or combination thereof. As non-limiting examples, the various embodiments herein can be implemented in one or more of: application-specific integrated circuits (ASICs), standard integrated circuits (ICs), programmable logic devices (PLDs), field-programmable gate arrays (FPGAs), computer programs executed by any number of computers or processors, programs executed by one or more control units or processor units, firmware, or any combination thereof.

The disclosure includes descriptions of several processors. Said processors can be implemented as any hardware capable of processing data, such as application-specific integrated circuits (ASICs), standard integrated circuits (ICs), programmable logic devices (PLDs), field-programmable gate arrays (FPGAs), logic circuits, or any other appropriate hardware. The disclosure also includes descriptions of several non-transitory processor-readable storage mediums. Said non-transitory processor-readable storage mediums can be implemented as any hardware capable of storing data, such as magnetic drives, flash drives, RAM, or any other appropriate data storage hardware. Further, mention of data or information being stored at a device (e.g. vehicle device 122 or network device 110) generally refers to the data information being stored at a non-transitory processor-readable storage medium of said device (e.g. non-transitory processor-readable storage mediums 116 or 126).

What is claimed is:

1. A system comprising:

a management server having a first communication module, a first at least one processor, and a first at least one non-transitory processor readable storage medium storing first processor-executable instructions thereon;

a telematics device having a second communication module, a third communication module, a second at least one processor, and a second at least one non-transitory processor readable storage medium storing second processor-executable instructions thereon; and a peripheral device having a fourth communication module, a third at least one processor, and a third at least one non-transitory processor readable storage medium storing third processor-executable instructions thereon, wherein:

the first processor-executable instructions cause the management server to:

receive, by the management server, a user input indicative of a setting update for the peripheral device; and transmit, by the first communication module, a setting update message which specifies at least one setting to apply at the peripheral device based on the user input indicative of a setting update;

the second processor-executable instructions cause the telematics device to:

receive, by the third communication module, the setting update message from the management server; and transmit, by the second communication module, the setting update message; and the third processor-executable instructions cause the peripheral device to:

receive, by the fourth communication module, the setting update message from the telematics device; and apply, by at least one processor of the peripheral device, the at least one setting specified in the setting update message.

2. The system of claim 1, wherein:

the setting update message includes a plurality of sequential message segments; and the first processor-executable instructions which cause the management server to transmit the setting update message cause the first communication module to transmit each message segment of the plurality of message segments in sequence.

3. The system of claim 2, wherein the second processor-executable instructions which cause the telematics device to transmit the setting update message cause the second communication module to transmit each message segment of the plurality of message segments in sequence.

4. The system of claim 2, wherein:

the second processor-executable instructions further cause the telematics device to bundle, by the second at least one processor, at least a subset of the plurality of message segments as at least one bundled set of message segments, the second processor-executable instructions which cause the telematics device to transmit the setting update message cause the second communication module to transmit the at least one bundled set of message segments.

5. The system of claim 4, wherein the second processor-executable instructions which cause the telematics device to bundle at least a subset of the plurality of message segments as at least one bundled set of message segments cause the second at least one processor to bundle all of the plurality of message segments as a single bundled set of message segments.

6. The system of claim 4, wherein the second processor-executable instructions which cause the telematics device to bundle at least a subset of the plurality of message segments as at least one bundled set of message segments cause the second at least one processor to bundle respective subsets of the plurality of message segments as a plurality of bundled sets of message segments.

7. The system of claim 2, wherein:

the first processor-executable instructions which cause the first communication module to transmit each message segment of the plurality of message segments in sequence cause the first communication module to, for each message segment:

transmit the message segment; and receive an acknowledgement of the message segment by the third communication module; and in response to improper reception of a message segment by the third communication module, the first processor-executable instructions cause the management server to transmit a subset of the plurality of message segments in sequence, starting from a sequentially first message segment for which an acknowledgement was not received by the first communication module.

8. The system of claim 2, wherein in response to receiving, by the management server, a further user input indicative of a further setting update for the peripheral device while transmitting the setting update message:

the first processor-executable instructions cause the management server to update the setting update message to include at least one further message segment which specifies at least one setting to apply at the peripheral device based on the further user input indicative of the further setting update.

9. The system of claim 8, wherein the first processor-executable instructions which cause the first communication module to transmit each message segment of the plurality of message segments in sequence cause the first communication interface to, for each message segment:

after the setting update message is updated:

transmit the further message segment after the first communication module receives an acknowledgement from the third communication module of a particular message segment which includes changes to at least one particular setting updated in the further setting update.

10. The system of claim 8, wherein the first processor-executable instructions which cause the management server to update the setting update message to include the at least one further message segment which includes instructions to apply the further setting update at the peripheral device cause the management server to:

insert the at least one further message segment into the setting update message immediately sequential to a particular message segment which includes changes to the at least one setting updated in the further setting update.

11. The system of claim 8, wherein the first processor-executable instructions which cause the management server to update the setting update message to include the at least one further message segment which includes instructions to apply the further setting update at the peripheral device cause the management server to:

insert the at least one further message segment into the setting update message sequentially after all message segments initially in the plurality of message segments.

12. The system of claim 1, wherein, in response to receiving, by the management server while transmitting the setting update message, a further user input indicative of a further setting update for the peripheral device:

the first processor-executable instructions further cause the management server to:

transmit, by the first communication module, a further setting update message which specifies at least one setting to apply at the peripheral device based on the further user input indicative of the further setting update;

the second processor-executable instructions further cause the telematics device to:

receive, by the third communication module, the further setting update message from the management server; and transmit, by the second communication module, the further setting update message; and the third processor-executable instructions further cause the peripheral device to:

receive, by the fourth communication module of the peripheral device, the further setting update message from the telematics device; and apply, by the at least one processor of the peripheral device, the at least one further setting specified in the further setting update message.

13. The system of claim 1, wherein:

the first processor-executable instructions further cause the management server to, prior to transmitting the setting update message to the telematics device, encrypt the setting update message; and the third processor-executable instructions cause the peripheral device to decrypt the setting update message.

14. The system of claim 1, wherein:

the peripheral device comprises a fifth communication module;

the setting update message specifies at least one setting for the peripheral device to communicate via the fifth communication module with a communication access point; and the third processor-executable instructions which cause the peripheral device to apply the at least one setting specified in the setting update message cause the peripheral device to open communication via the fifth communication module with the communication access point.

15. The system of claim 1, wherein:

the peripheral device comprises a fifth communication module, wherein the fifth communication module communicates with a first communication access point;

the setting update message specifies at least one setting for the peripheral device to communicate via the fifth communication module with a second communication access point different from the first communication access point; and the third processor-executable instructions which cause the peripheral device to apply the at least one setting specified in the setting update message cause the peripheral device to open communication via the fifth communication module with the second communication access point and terminate communication via the fifth communication module with the first communication access point.

16. The system of claim 1, wherein the user input indicative of a setting update for the peripheral device comprises a user input via a user interface communicatively coupled to the management server and remote from the telematics device and the peripheral device.

17. The system of claim 1, wherein the user input indicative of a setting update for the peripheral device comprises a user input via a user interface communicatively coupled to the management server and proximate the telematics device and the peripheral device.

18. The system of claim 1, wherein the first processor-executable instructions further cause the management server to:

store, by the first at least one non-transitory processor-readable storage medium, a first update session, the first update session specifying the at least one setting to apply at the peripheral device based on the user input indicative of the setting update; and prepare the setting update message by at least one processor of the management server by accessing the first update session and generating the setting update message to specify the at least one setting specified in the first update session.

19. The system of claim 18, wherein:

in response to receiving a further user input indicative of a further setting update for the peripheral device, before completion of applying the at least one setting specified in the setting update message: the first processor-executable instructions further cause the management server to store, by the first at least one non-transitory processor-readable storage medium, a second update session, the second update session specifying the at least one further setting to apply at the peripheral device based on the further user input indicative of the further setting update; and after completion of applying the at least one setting specified in the setting update message:

the first processor executable instructions further cause the management server to:

prepare a second setting update message by the at least one processor of the management server by accessing the second update session and generating the second setting update message to specify the at least one setting to be updated at the peripheral device as specified in the second update session; and transmit, by the first communication module, the second setting update message;

the second processor executable instructions further cause the telematics device to:

receive, by the third communication module, the second setting update message from the management server; and transmit, by the second communication module, the second setting update message; and the third processor executable instructions further cause the peripheral device to:

receive, by the fourth communication module, the second setting update message from the telematics device; and apply, by the at least one processor of the peripheral device, the at least one setting specified in the second setting update message.

20. The system of claim 18, wherein:

in response to receiving a further user input indicative of a further setting update for the peripheral device, before completion of applying the at least one setting specified in the setting update message:

the first processor executable instructions further cause the management server to:

store, by the first at least one non-transitory processor-readable storage medium, at least one further update session, each further update session specifying a respective setting update of the at least one further setting update date to apply at the peripheral device based on the at least one further user input indicative of the at least one further setting update; and after completion of applying the at least one setting specified in the setting update message, sequentially for each further update session of the at least one further update session:

the first processor executable instructions further cause the management server to:

prepare an additional setting update message by the at least one processor of the management server by accessing the further update session and generating the additional setting update message to specify the at least one setting to be updated at the peripheral device as specified in the further update session; and transmit, by the first communication module, the further setting update message;

the second processor executable instructions further cause the telematics device to:

receive, by the third communication module, the further setting update message from the management server; and transmit, by the second communication module, the further setting update message; and the third processor executable instructions further cause the peripheral device to:

receive, by the fourth communication module, the further setting update message from the telematics device; and apply, by the at least one processor of the peripheral device, the at least one setting specified in the further setting update message.

\* \* \* \* \*